United States Patent [19]

Baker

[11] Patent Number: 5,064,053
[45] Date of Patent: Nov. 12, 1991

[54] VIBRATORY DRIVE SYSTEM FOR A VIBRATORY CONVEYOR APPARATUS AND A CONVEYOR APPARATUS HAVING SAME

[75] Inventor: Stephen T. Baker, Louisville, Ky.

[73] Assignee: Carrier Vibrating Equipment, Inc., Louisville, Ky.

[21] Appl. No.: 602,700

[22] Filed: Oct. 24, 1990

[51] Int. Cl.⁵ .............................................. B65G 27/32
[52] U.S. Cl. .................................... 198/753; 198/770; 74/61
[58] Field of Search ..................... 198/753, 770; 74/61, 74/87

[56] References Cited

U.S. PATENT DOCUMENTS

| | | | |
|---|---|---|---|
| 2,936,064 | 5/1960 | Schuessler | 74/61 |
| 3,145,831 | 8/1964 | Roder et al. | 198/753 |
| 3,385,119 | 5/1968 | Berger | 74/61 |
| 3,465,599 | 9/1969 | Hennecke et al. | 74/61 |
| 3,712,459 | 1/1973 | Musschoot et al. | 198/753 |
| 4,196,637 | 4/1980 | Barrot et al. | 74/61 |
| 4,241,615 | 12/1980 | Ryan | 74/61 |
| 4,267,919 | 5/1981 | Schrader | 198/770 |
| 4,510,815 | 4/1985 | Baumers et al. | 198/770 |

FOREIGN PATENT DOCUMENTS

| | | | |
|---|---|---|---|
| 2528269 | 1/1977 | Fed. Rep. of Germany | 198/770 |
| 498227 | 4/1976 | U.S.S.R. | 198/753 |

Primary Examiner—Joseph E. Valenza
Attorney, Agent, or Firm—Jon C. Winger

[57] ABSTRACT

A vibratory drive system for a vibratory conveyor apparatus is operable to selectively vary the conveying speed of the conveyor apparatus between zero, or stand-still, up to a maximum speed while the drive system is operating imparting a vibratory conveying force to the conveyor apparatus. The vibratory drive system is also operable to change direction of the conveyor apparatus between forward and reverse conveying directions also while the drive system is operating imparting a vibratory conveying force to the conveyor apparatus. In addition, the vibratory system can be adapted to provide either a linear drive force to the conveyor apparatus, or an elliptical drive force to the conveyor apparatus.

9 Claims, 32 Drawing Sheets

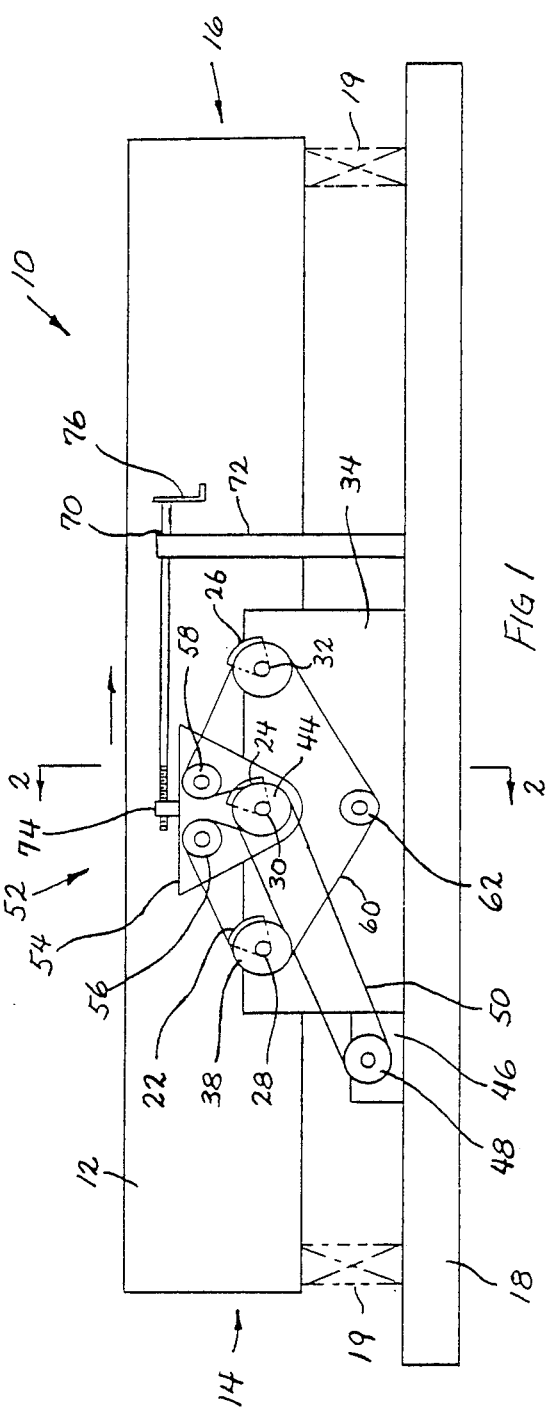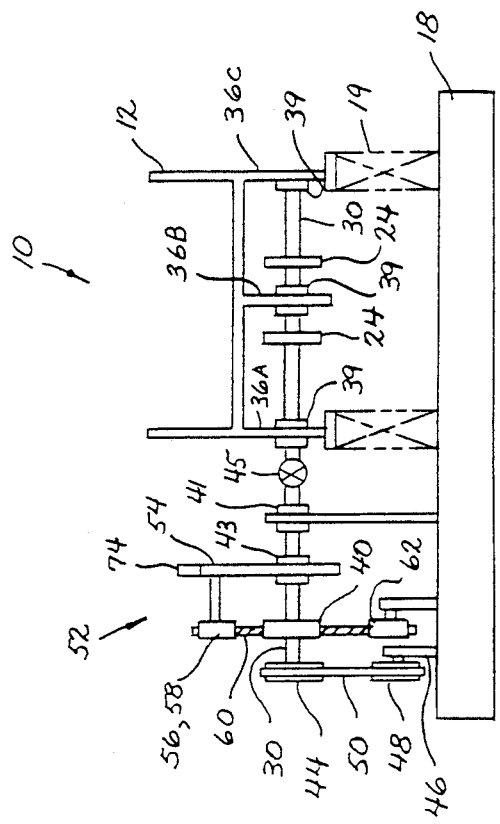

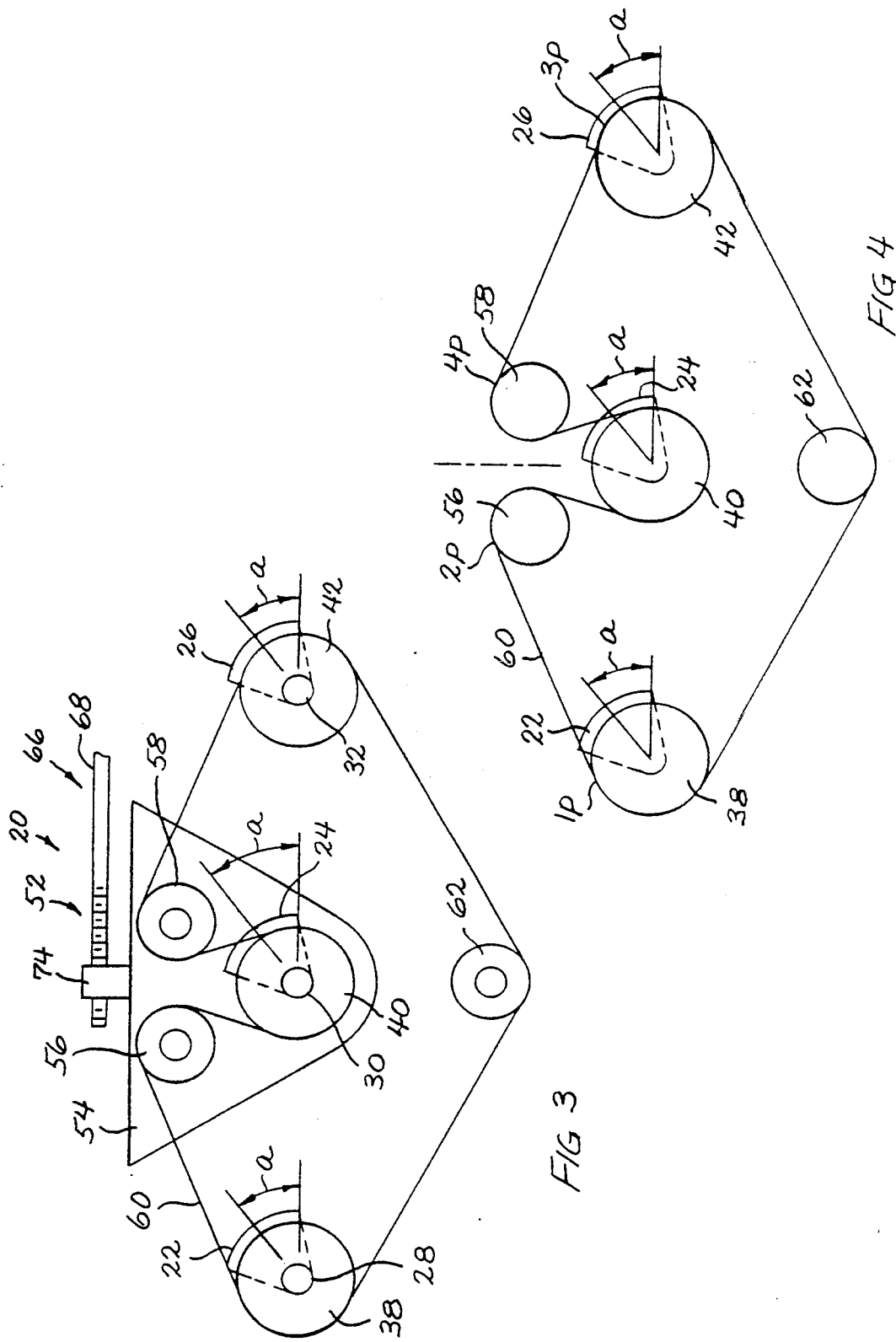

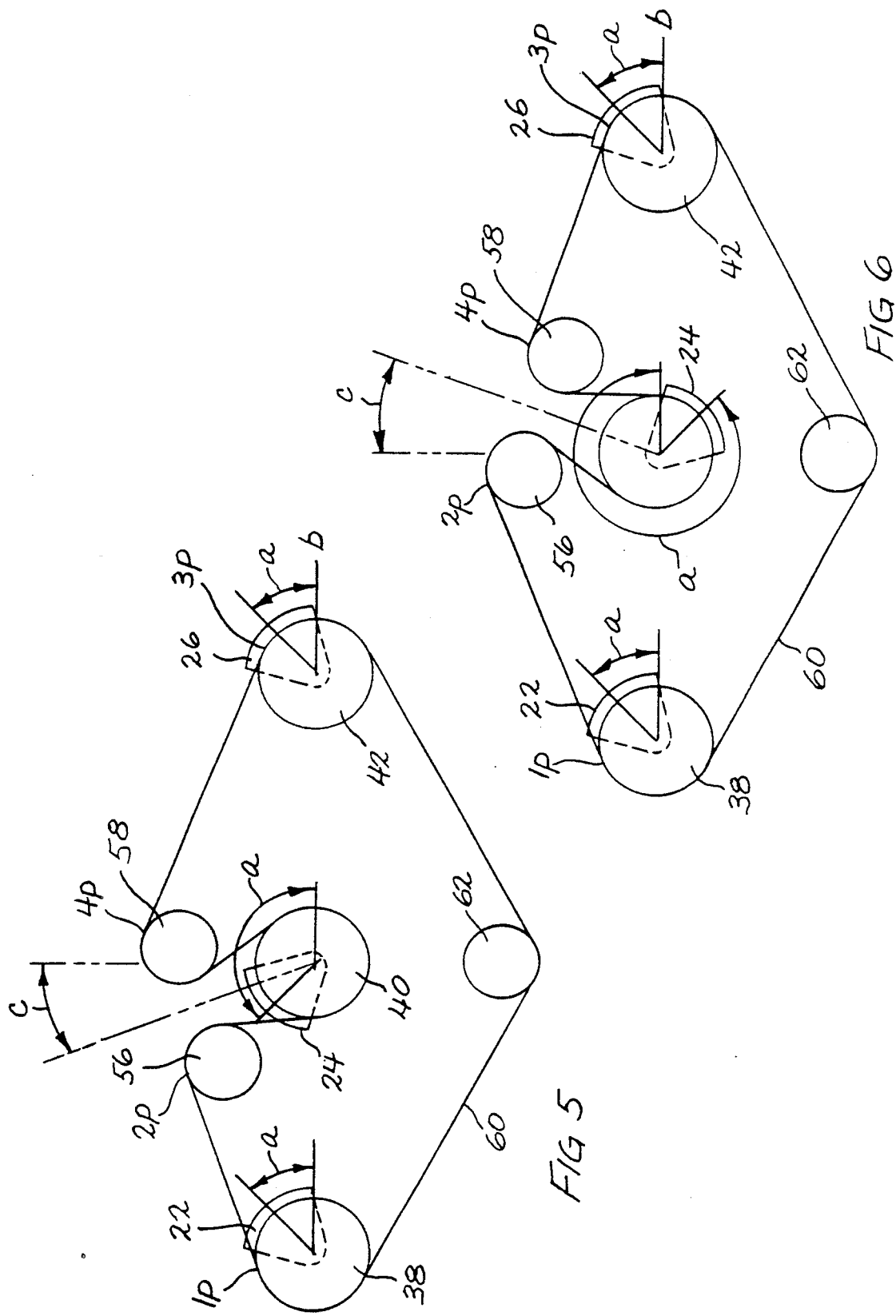

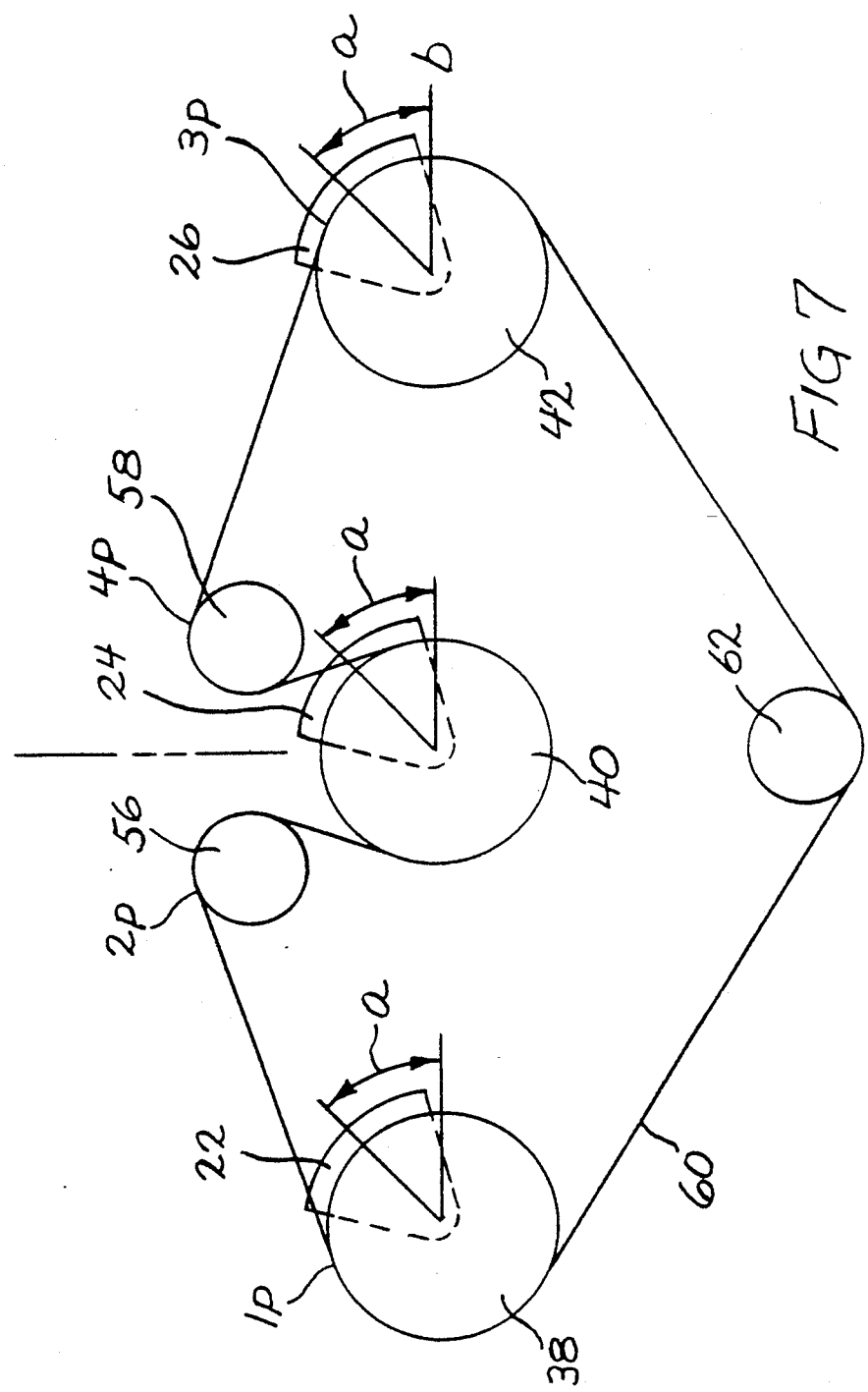

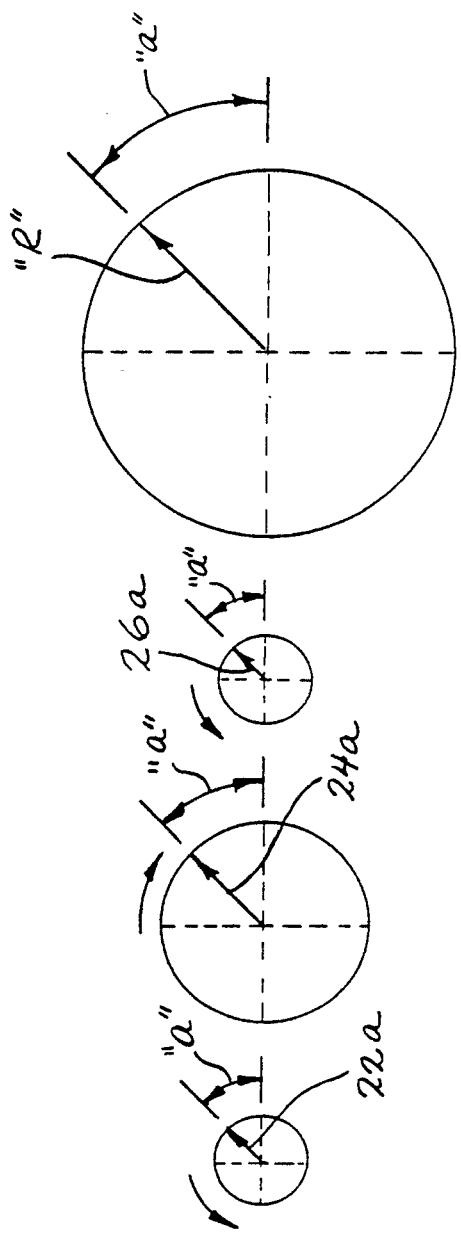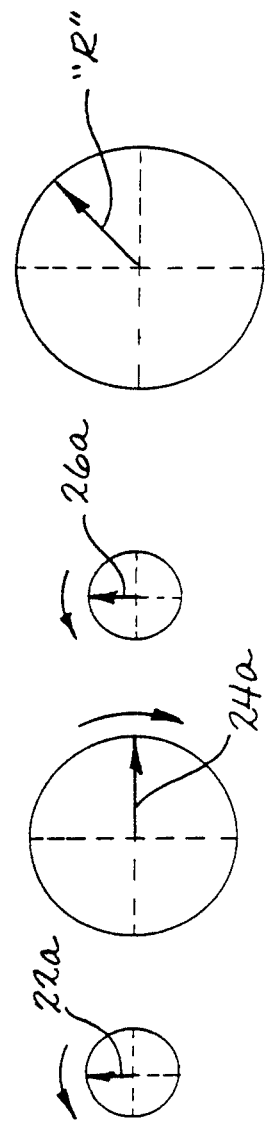
FIG 10a
FIG 10b

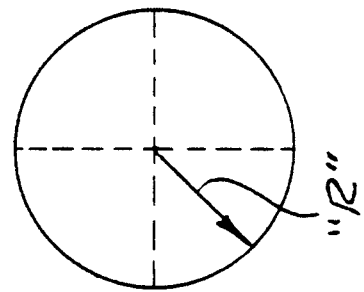
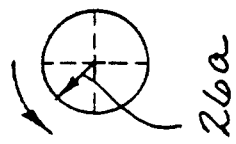
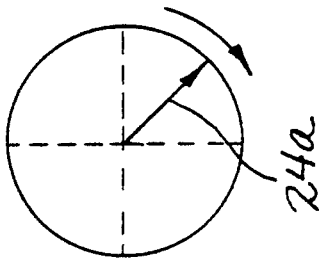
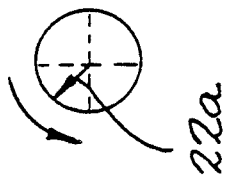
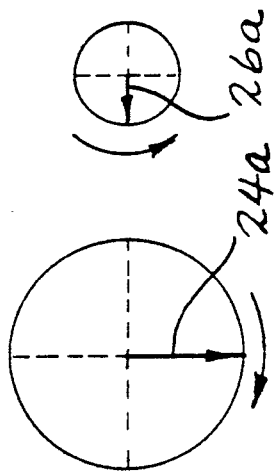
FIG 10c
FIG 10d

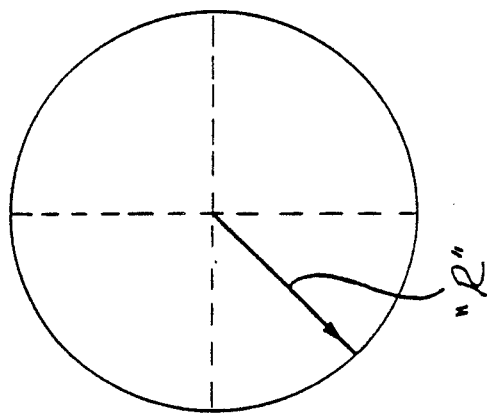
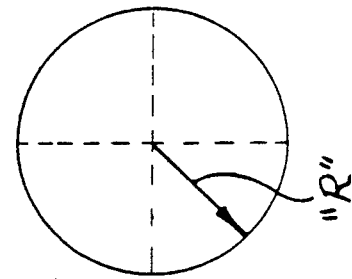
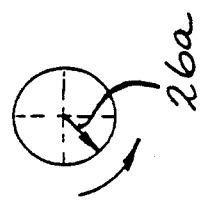
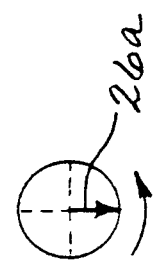
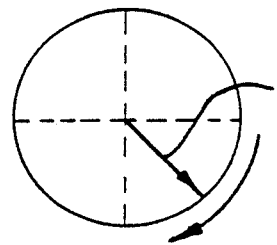
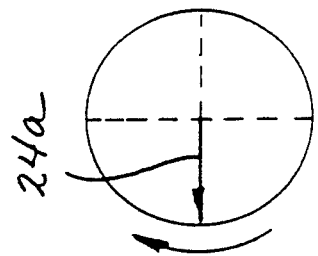
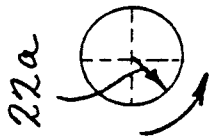
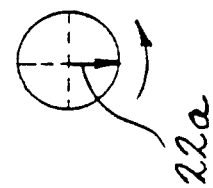
FIG 10e
FIG 10f

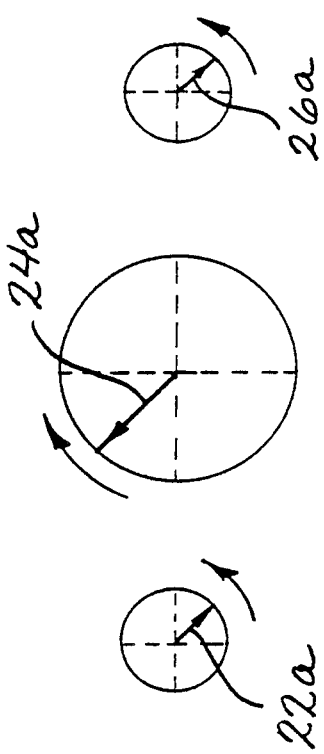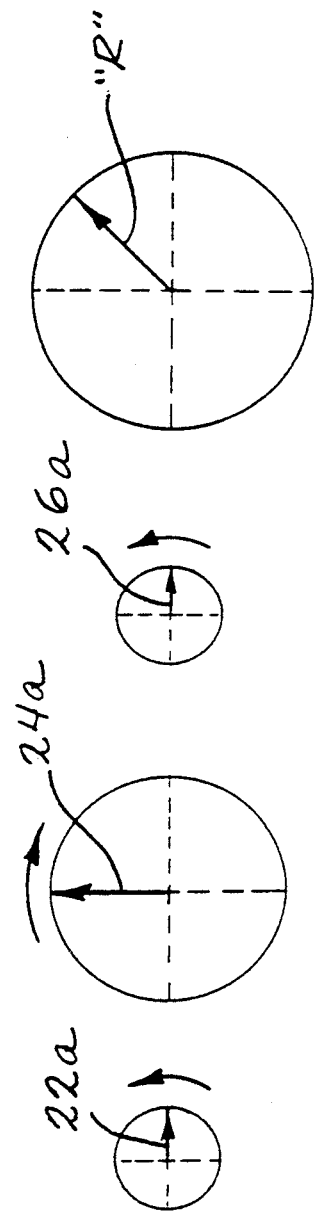

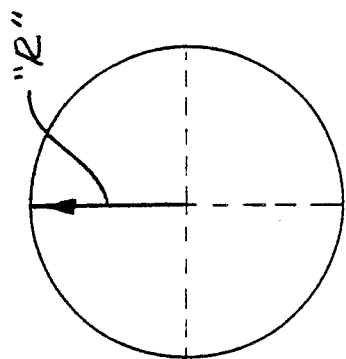
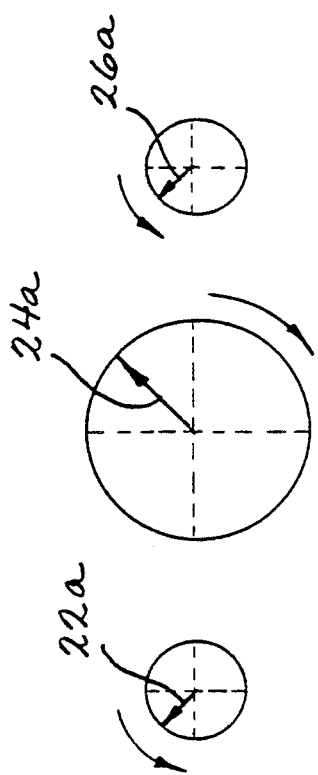
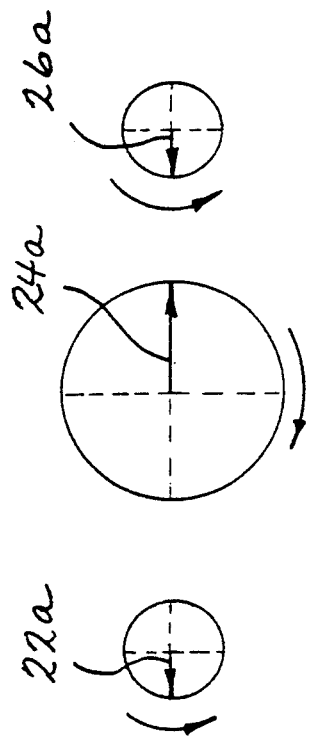
FIG 11c
FIG 11d

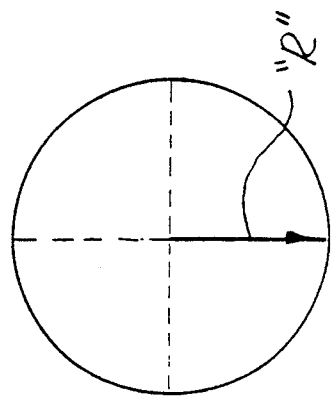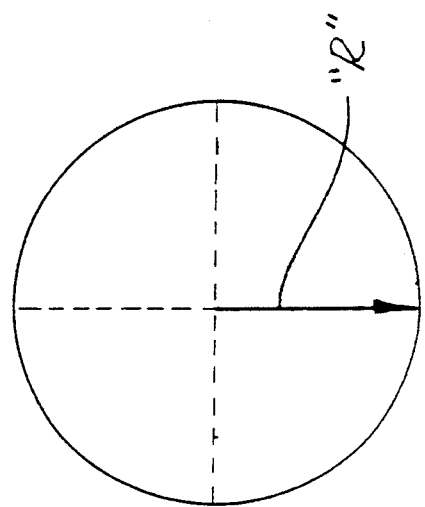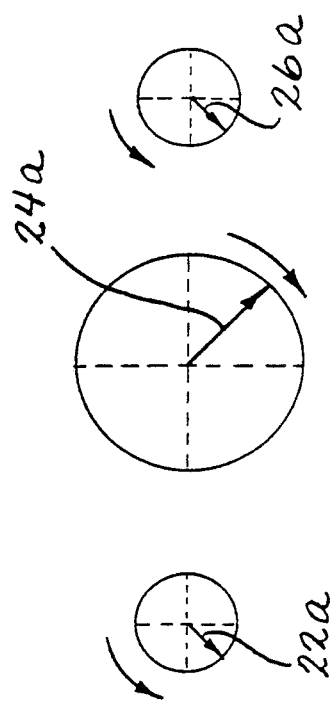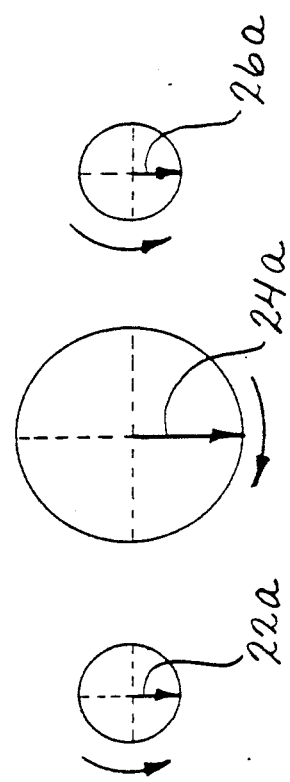
FIG. 11e
FIG. 11f

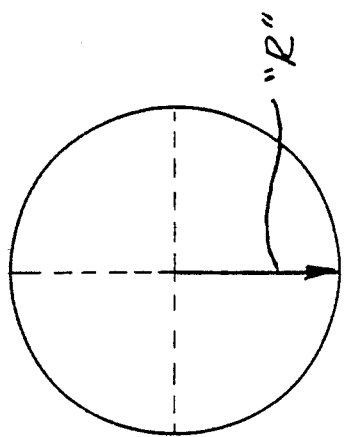
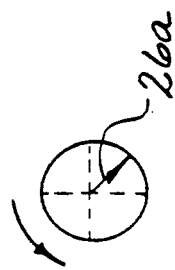
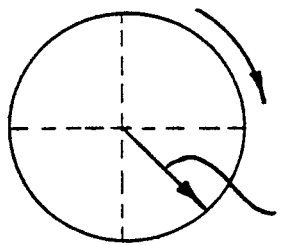
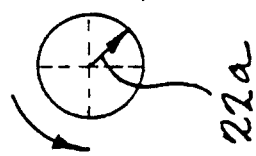
FIG 11g
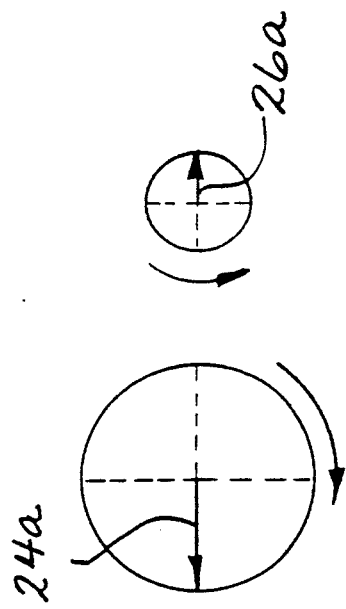
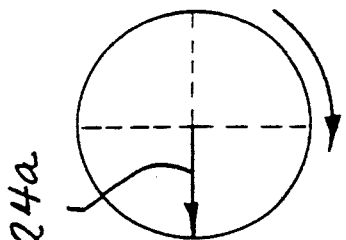
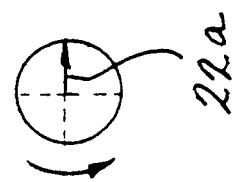
FIG 11h

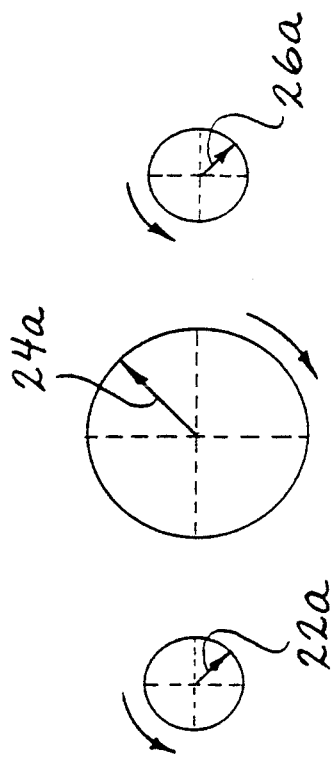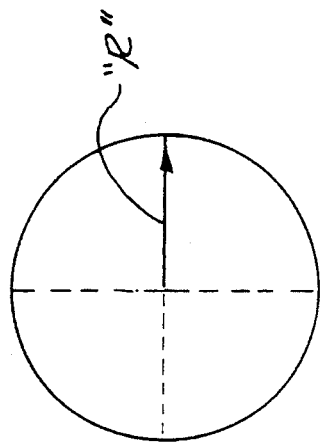
FIG. 12g
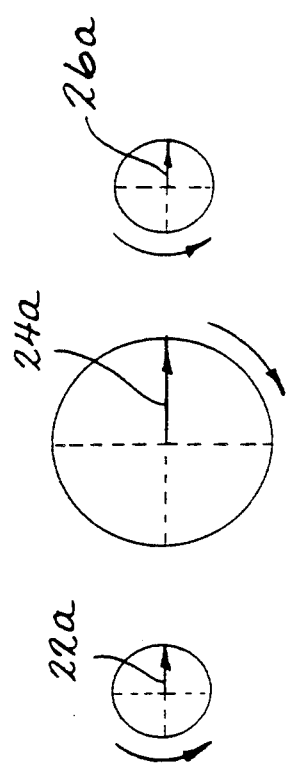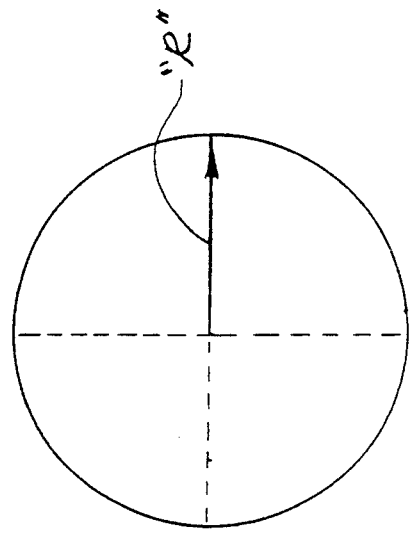
FIG. 12h

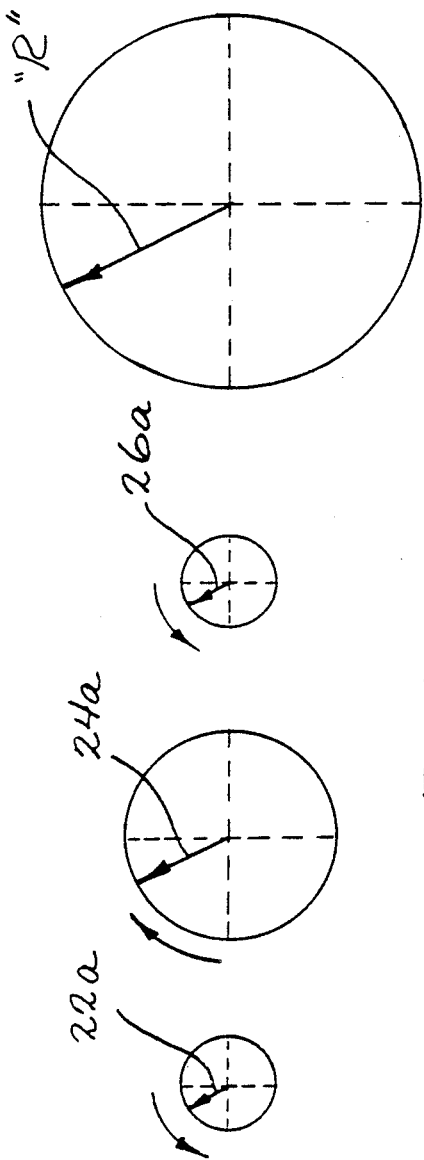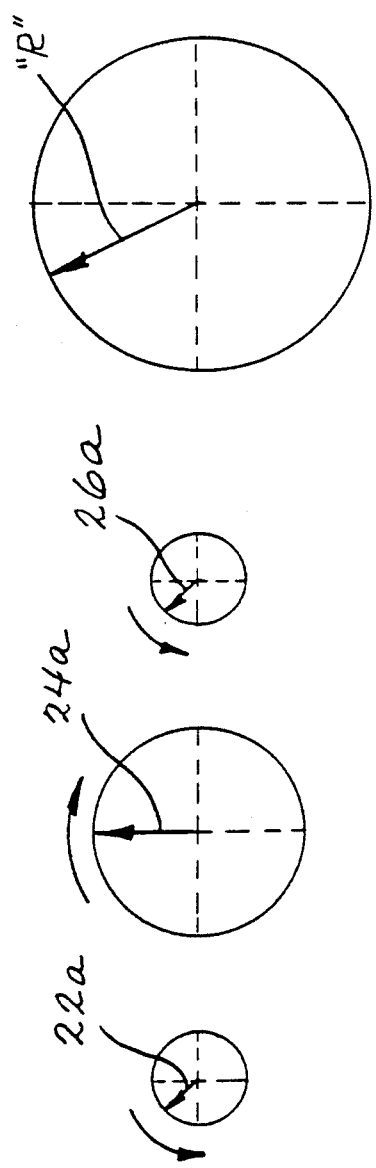

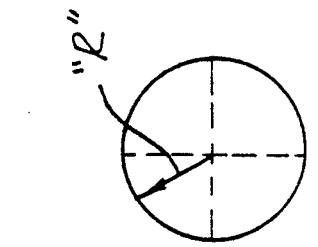
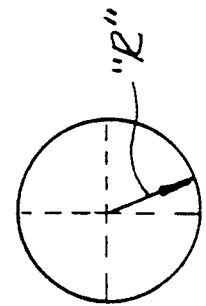
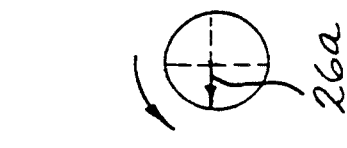
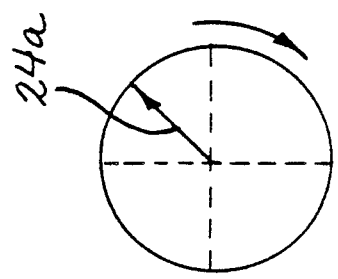
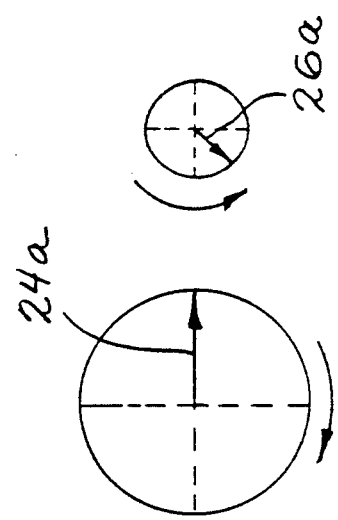
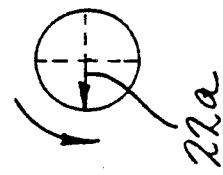
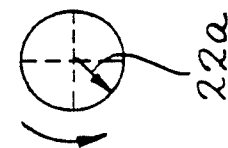
FIG 13e
FIG. 13f

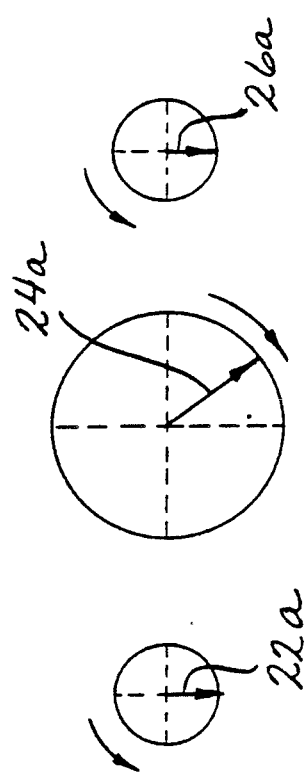
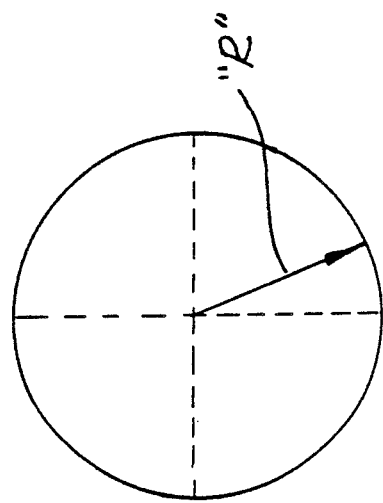
FIG. 13g
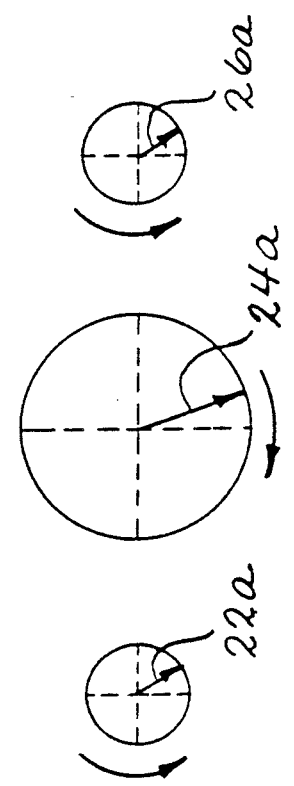
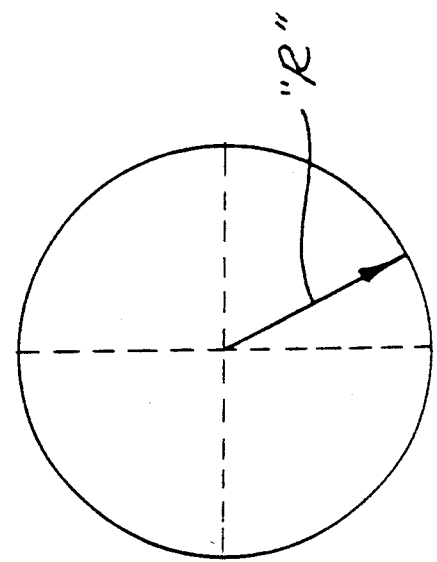
FIG. 13h

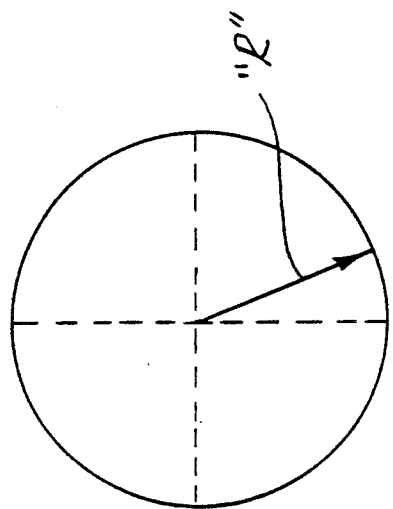
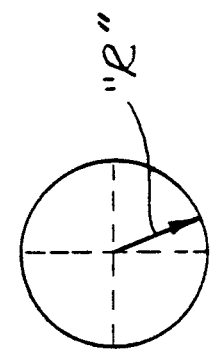
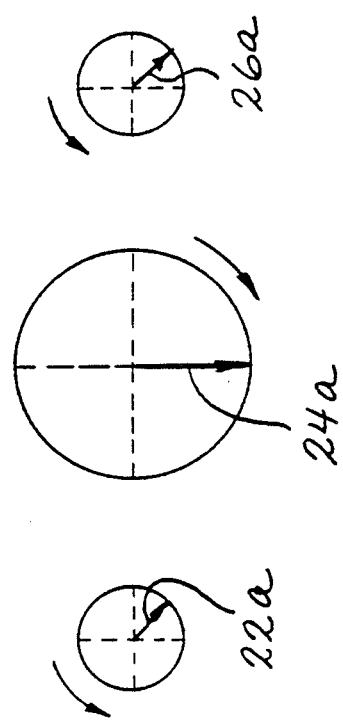
FIG 13i
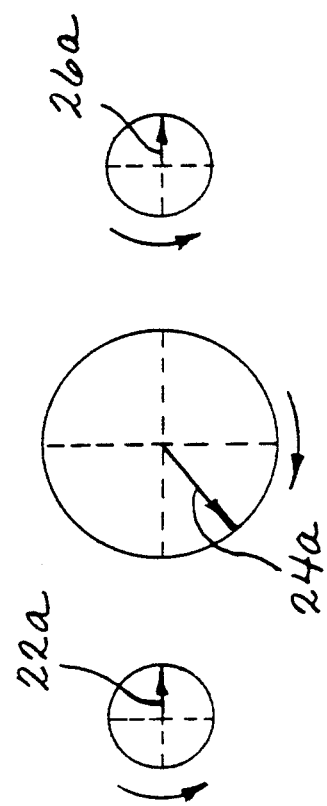
FIG 13j

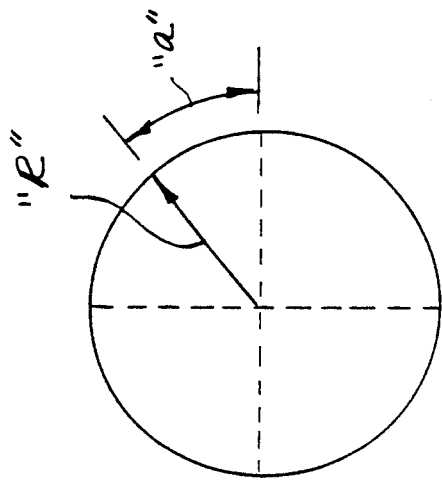
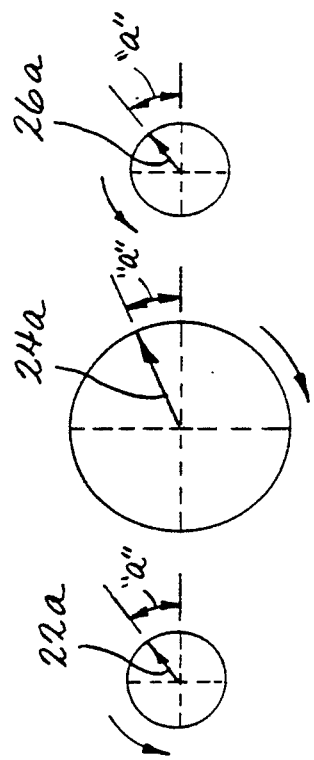
FIG. 14a
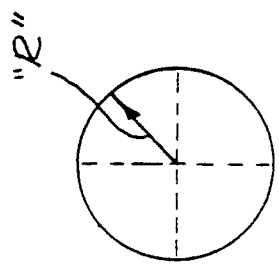
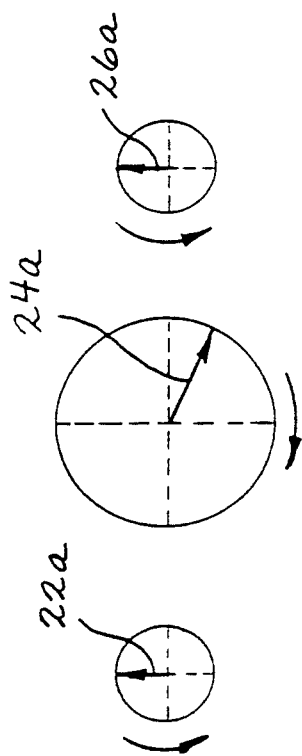
FIG. 14b

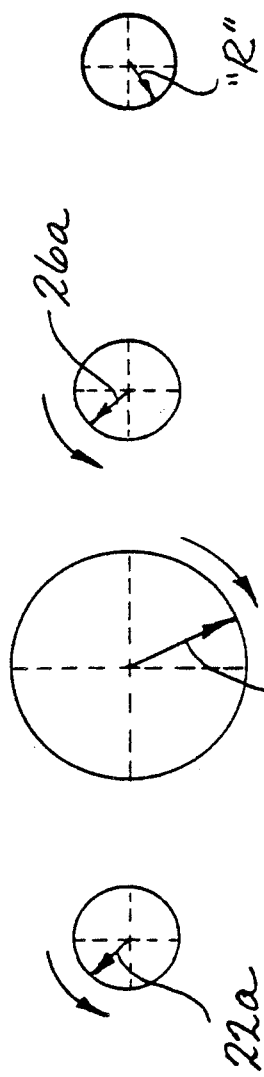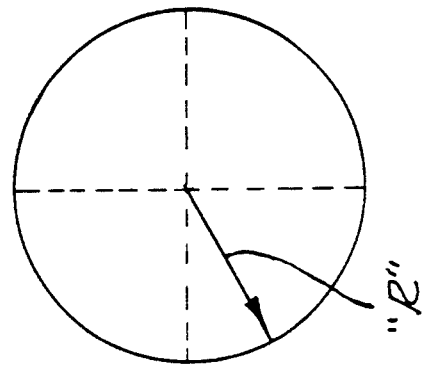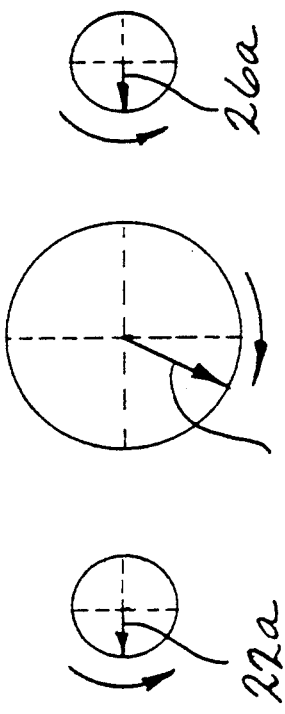
FIG 14c
FIG 14d

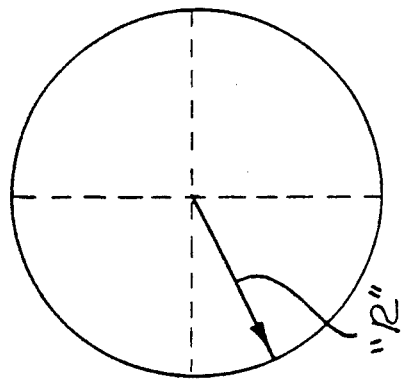
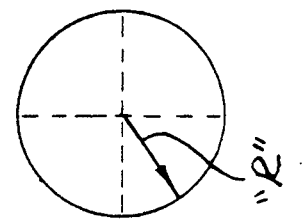
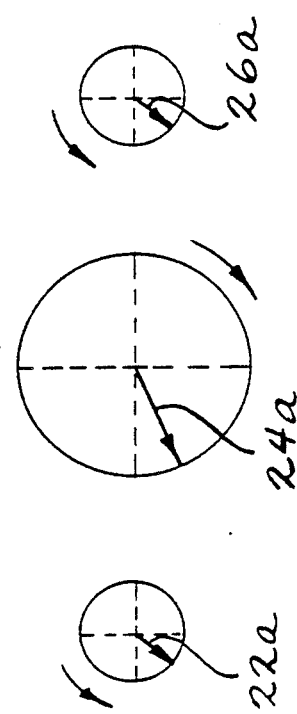
FIG 14e
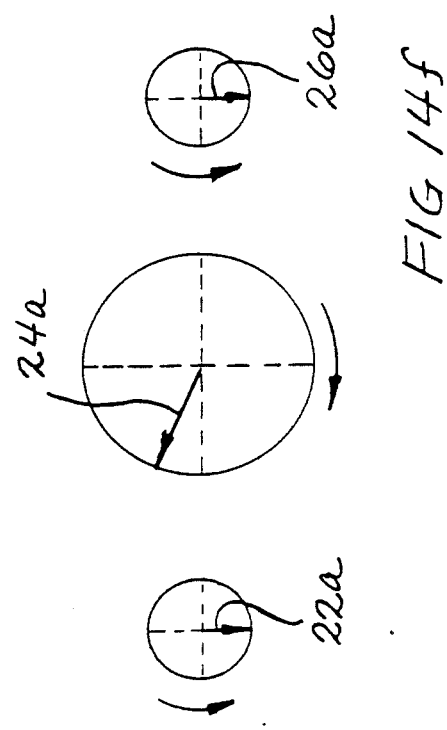
FIG 14f

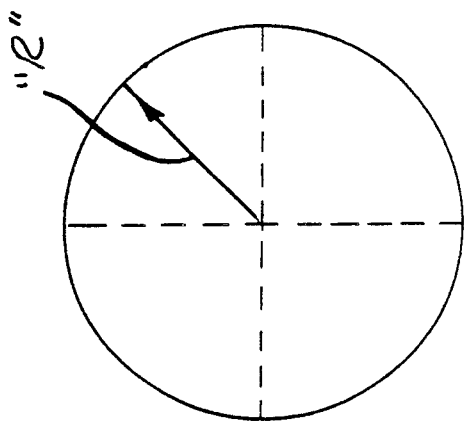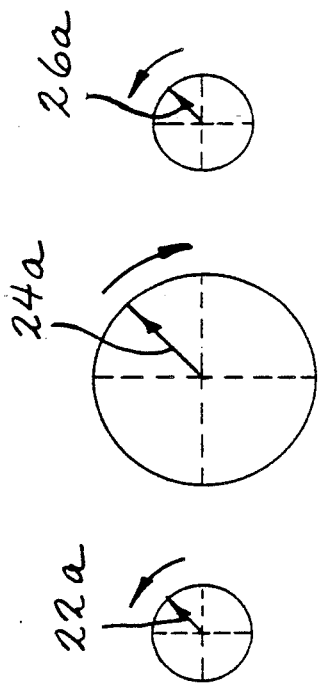
FIG 15a
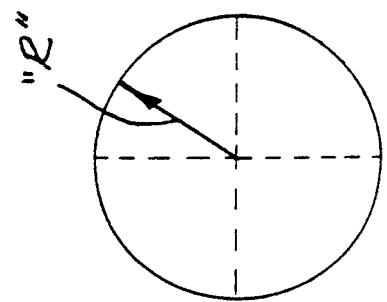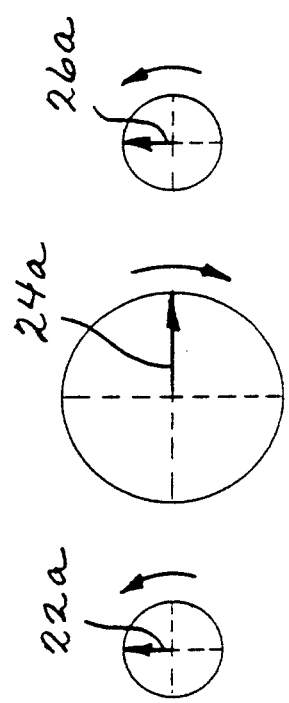
FIG 15b

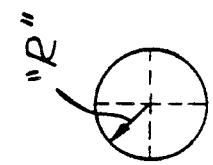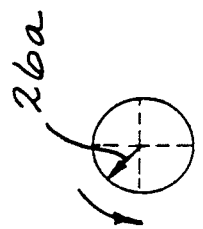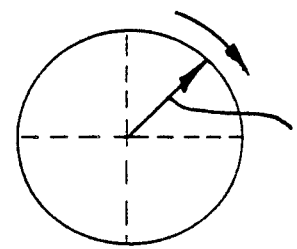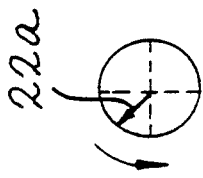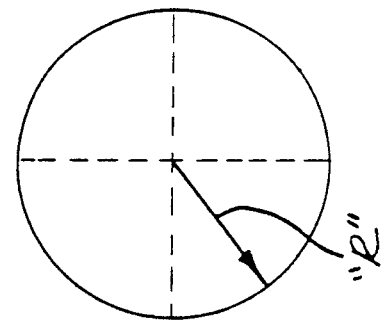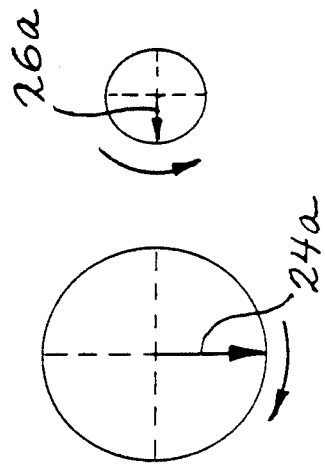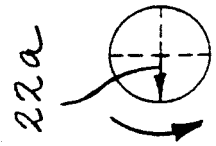
FIG 15c
FIG 15d

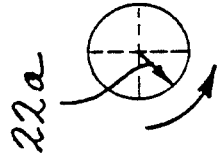
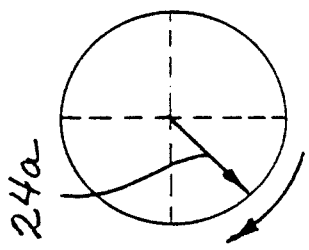
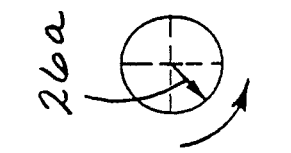
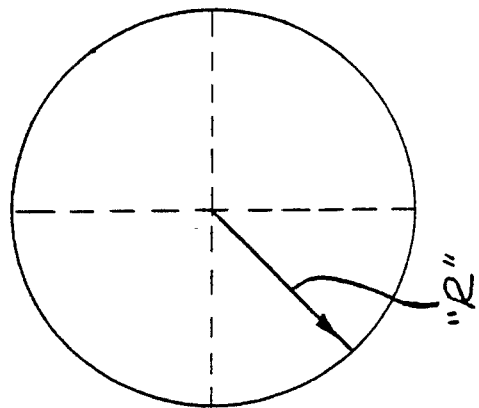
FIG 15e
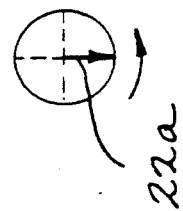
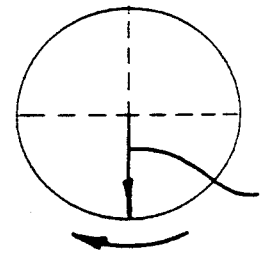
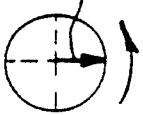
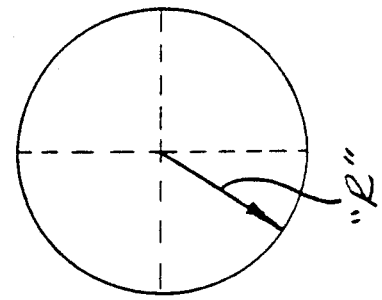
FIG 15f

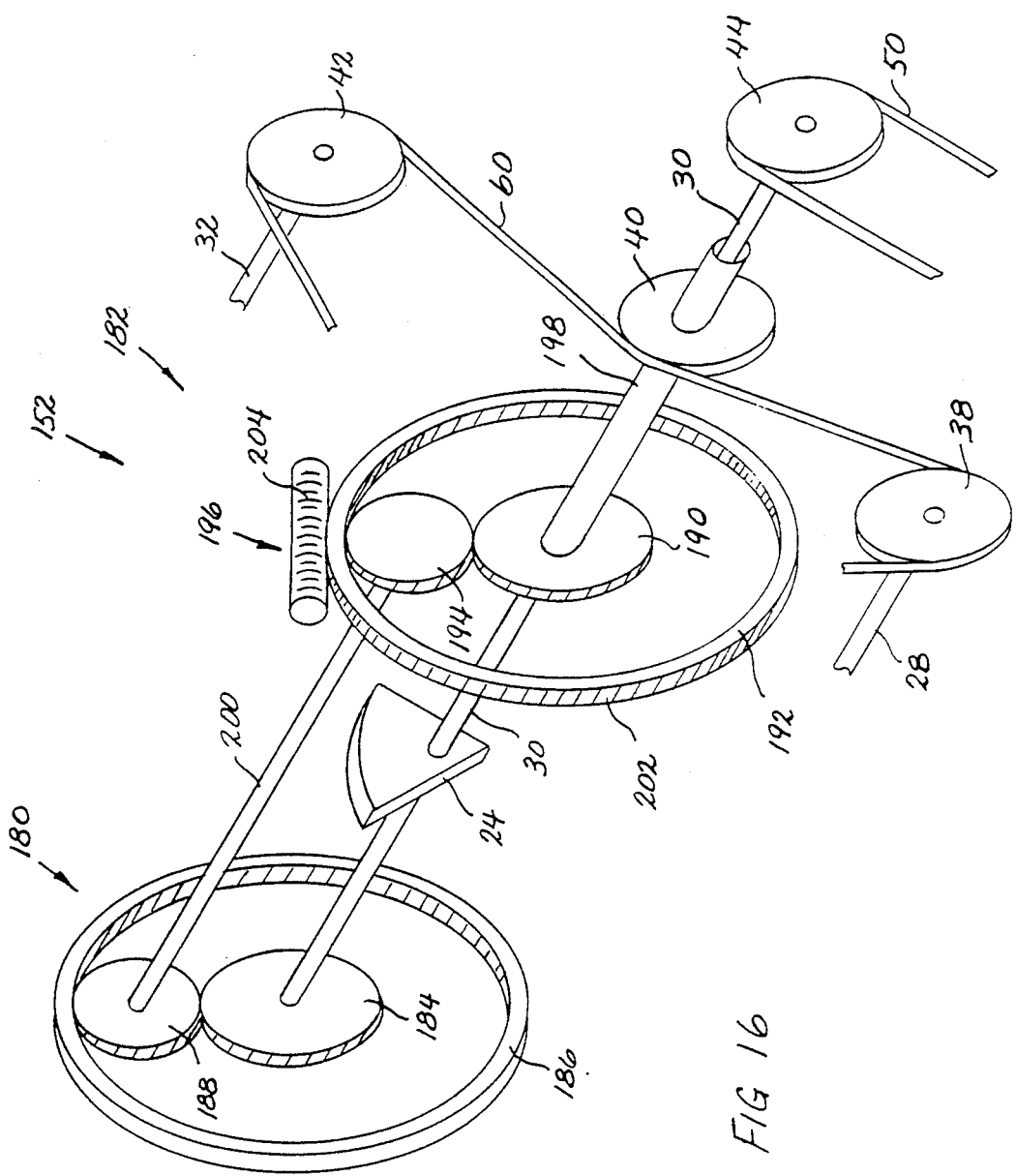

VIBRATORY DRIVE SYSTEM FOR A VIBRATORY CONVEYOR APPARATUS AND A CONVEYOR APPARATUS HAVING SAME

BACKGROUND OF THE INVENTION

The present invention relates to vibratory conveyor apparatus, and more particularly to a vibrating drive system for a vibratory conveyor apparatus utilizing eccentric rotating weights to impart a resultant vibratory drive force to the conveyor apparatus.

Eccentric weight drive systems for providing linear force generation to vibratory conveyor apparatus are known per se. These known eccentric weight drive systems typically utilize two counter rotating eccentric weights mounted for rotation on two parallel axles. The typical means for adjusting the output of these eccentric weight drive systems is to vary the speed of the drive by using, for example, electric motors with adjustable mechanical sheaves and vee-belts, or eddy current clutches, adjustable voltage D.C. motors, A.C. squirrel cage motors, or hydraulic motors for rotating the eccentric weights.

Other eccentric weight drive system having three or more rotary weights for providing vibratory forces are known for use with conveyor devices. The typical means for adjusting the output of these eccentric weight drive systems is to vary the speed of the drive by using, for example, electric motors with adjustable mechanical sheaves and vee-belts, or eddy current clutches, adjustable voltage D.C. motors, A.C. squirrel cage motors, or hydraulic motors for rotating the eccentric weights.

These known eccentric weight drive systems do not provide for selectively changing the conveying direction of the conveying apparatus between forward and reverse directions while the drive system is operating, nor do they provide for vibrating material on the conveyor without conveying the material.

SUMMARY OF THE INVENTION

The present invention provides a vibrating drive system for vibratory conveyor apparatus which furnishes a versatile operation of vibratory conveyor apparatus heretofore unknown.

The present invention also provides a vibratory drive system for vibratory conveyor apparatus for selectively infinitely adjusting the conveying speed in a speed range between zero, or stand-still, and a maximum while the vibrating drive system is operating, that is without having to shut-down the conveyor apparatus and without changing the speed of the drive motor driving the vibrating drive system.

The present invention further provides a vibratory drive system for vibratory conveyor apparatus for selectively operating the conveyor apparatus at zero conveying speed, or stand-still, while still operating to vibrate the conveyor apparatus and, therefore, the material thereon.

The present invention still further provides a vibrating drive system of the class described for selectively changing the conveying direction of the conveyor apparatus between forward and reverse directions when the drive system is not being operated, and more particularly, while the drive system is operating.

The present invention even further provides a vibratory drive system which is easily adapted to provide either a linear drive force to the conveyor apparatus, or an elliptical drive force to the conveyor apparatus.

More particularly, the present invention provides a vibrating drive system for a vibratory conveyor apparatus for selectively infinitely adjusting the conveying speed from zero to a maximum, and for selectively changing the conveying direction of the vibrating conveyor apparatus between forward and reverse conveying directions while the drive system is operating comprising three eccentric weights in side-by-side relationship at relative phase angles to each other mounted on parallel axels for rotation about parallel axes, attachment means for attaching the eccentric weights to the conveyor apparatus to impart a resulting vibratory force to the conveyor apparatus, drive means for rotating the outermost weights about their respective axis of rotation in a first direction and for rotating the intermediate weight about its axis of rotation in a second direction opposite to the first direction of the outermost weights, and phase angle adjustment means for selectively varying the relative phase angle between the outermost eccentric weights and the intermediate eccentric weight.

BRIEF DESCRIPTION OF THE DRAWINGS

A better understanding of the present invention will be had upon reference to the following discussion in conjunction with the drawings wherein like numerals refer to like parts through the several views and in which:

FIG. 1 is a schematic side view of a typical vibratory conveyor apparatus of a known type having the vibratory drive system of the present invention;

FIG. 2 is a transverse cross-sectional view of the apparatus as seen in the direction of arrows 2—2 in FIG. 1;

FIG. 3 is an enlarged schematic side view of one embodiment of the drive system of the present invention;

FIG. 4 is a schematic representation of the vibratory drive system of FIG. 3 of the present invention in an initial operating position;

FIG. 5 is a schematic representation of the vibratory drive system of FIG. 4 of the present invention in a first adjusted operating position;

FIG. 6 is a schematic representation of the vibratory drive system of FIG. 4 of the present invention in a second adjusted operating position;

FIG. 7 is a schematic representation of the vibratory drive system of FIG. 3 of the present invention similar to that of FIG. 4, in an initial operating position having different sized components and spacings between these components than those of the vibratory drive system of FIG. 4;

FIGS. 10a–10h vectorially represent the sequence of operation of the present invention generating a linear drive force and in the initial operating position of FIG. 4;

FIGS. 11a–11h vectorially represent the sequence of operation of the present invention in a first adjusted operating position of FIG. 5;

FIGS. 12a–12h vectorially represent the sequence of operation of the present invention in a second adjusted operating position of FIG. 6;

FIGS. 13a–13j vectorially represent the operation of the present invention in another first adjusted operating position;

FIGS. 14a–14h vectorially represent the operation of the present invention in another second adjusted operating position.

FIGS. 15a–15h vectorially represent the sequence of operation of the present invention generating an orbital or eliptical drive force and in the initial operating position of FIG. 4; and, FIG. 16 schematically illustrates an alternative embodiment of a component of the present invention.

DETAILED DESCRIPTION OF THE PREFERRED EMBODIMENT

Figure 8:
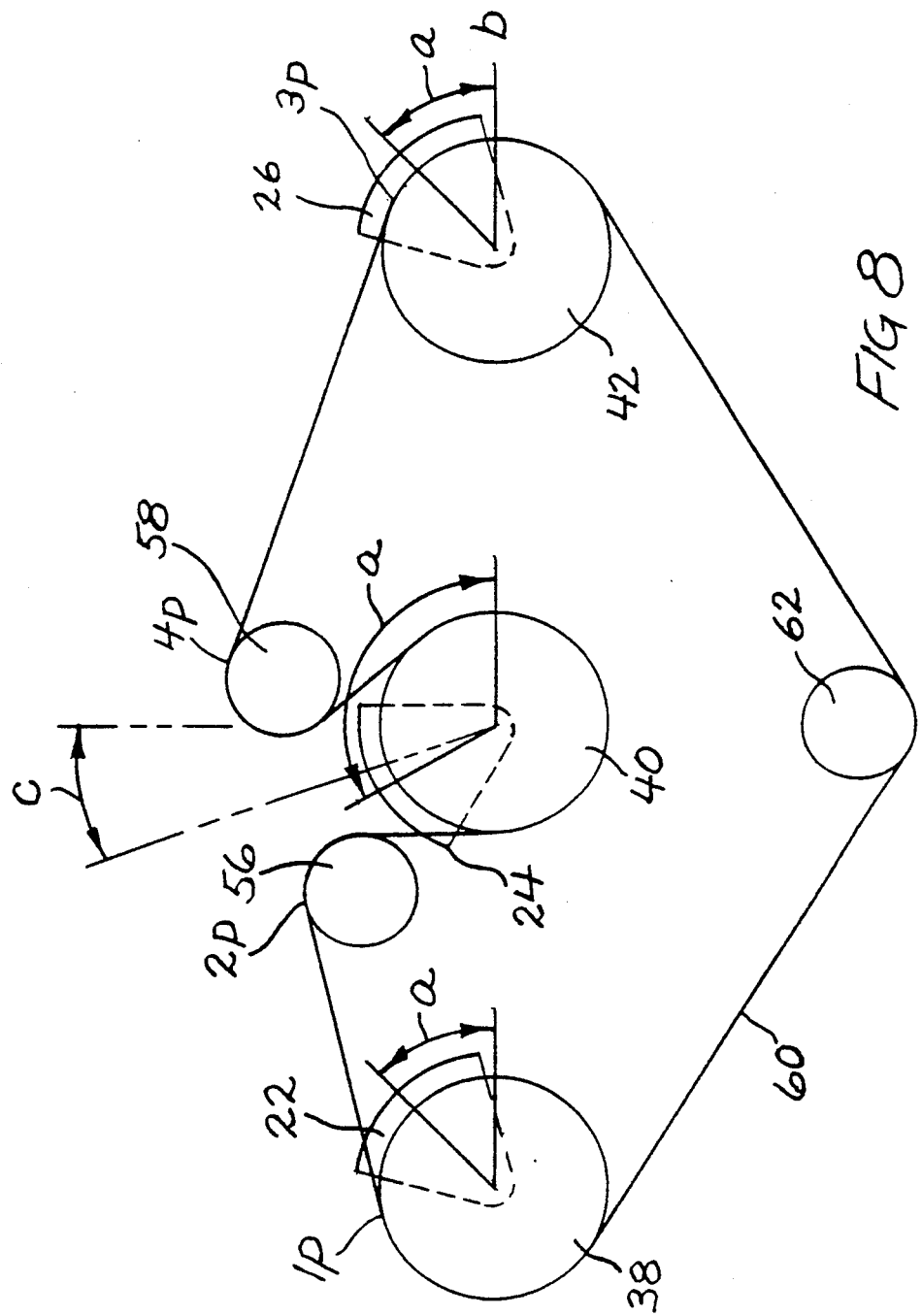
FIG. 8 is a schematic representation of the vibratory drive system of FIG. 7 of the present invention in a first adjusted operating position.

With reference to FIG. 1, there is shown a conventional vibratory conveyor apparatus, generally denoted as the numeral 10. Typical, such conventional vibratory conveyor apparatus 10 includes a conveying deck or trough 12 along which material is conveyed from the inlet end 14 to the outlet end 16. Usually, such vibratory conveyor apparatus 10 includes a conveying deck support frame 18. The conveyor deck 12 is located above or below the support frame 18 such that the conveyor deck 12 is either supported above or suspended from the support frame 18. For the sake of brevity of description of the present invention, the conveyor deck 12 is shown as being located above the support frame 18, it being clearly understood that the present invention to be hereinafter described can be used with equal versatility with a conveyor apparatus having the conveying deck 12 suspended from the support frame 18. As shown, the conveying deck 12 is supported above and is interconnected to the support frame 18 by isolation means 19, such as, for example, coil springs, resilient pads and the like in a manner well known in the art of vibratory conveyor apparatus.

It should further be clearly understood at this point, that the present invention can be used with vibratory conveyor apparatus of virtually any design, and for the reason that the conveyor apparatus per se does not comprise a part of the present invention, for the sake of brevity, the conveyor apparatus will not be further described.

With continued reference to FIG. 1, and in addition to FIGS. 2 and 3, there is shown a vibratory drive system generally denoted as the numeral 20 for a vibratory conveyor apparatus, such as the conveyor apparatus 10, operatively connected to the conveying deck 12 of the conveyor apparatus 10 which provides for selectively infinitely adjusting the conveying speed from zero, or stand-still, to a maximum, and also provides for selectively changing the conveying direction of the vibratory conveyor apparatus 10 between a forward conveying direction for conveying material from the inlet 14 toward the outlet 16 and a reverse conveying direction for conveying material from the outlet 16 back toward the inlet 14 of the conveyor apparatus 10.

As can be best seen in FIGS. 1, 2 and 3, the vibratory drive system 20 of the present invention comprises three eccentric weights 22, 24, 26, each attached to a different one of three parallel axles 28, 30, 32, respectively, for rotation therewith about parallel axes. The eccentric weights are attached to their respective axles at relative phase angles "a" to each other measured from a datum such as, for example, an imaginary horizontal line "b". As the weights 22, 24, 26 rotate, they cooperate to generate a resultant force imparted to the conveyor deck 12. The axles 28, 30, 32 are journal mounted to an upstanding mounting plate 34 which is attached to, for example, the support frame 18 so that the axles 28, 30, 32 extend transversely of the deck 12. As shown best in FIG. 2, the conveyor deck 12 includes three parallel spaced apart depending axle mounting flanges 36A, 36B, 36C longitudinally of the conveying deck 10. The upstanding mounting plate 34 is parallel to and spaced from one of these axle mounting flanges 36A. The three axles 28, 30, 32 extend across the flanges 36A, 35B, 36C and project outwardly from the flange 36A. The three shafts 28, 30, 32 are journal mounted in appropriate bearings 39 attached to the flanges 36A, 36B, 36C. As illustrated best in FIG. 2, in a commercial embodiment, the weight 22 would be a pair of weights mounted in spaced apart relationship on the axle 28 between the flanges 36A and 36C, the weight 24 would be a pair of weights mounted in spaced apart relationship on the axle 30 between the flanges 36A and 36C, and the weight 26 would be a pair of weights mounted in spaced apart relationship on the axle 32 between the flanges 36A and 36C. The relationship is illustrated in FIG. 2, which shows a pair of weights 24 mounted to the axle 30. This arrangement of weights 22, 24, 26 eliminates unnecessary torsional loading on the conveyor deck 12 which may occur if one weight 22 was mounted on axle 28, one weight 24 was mounted on axle 30, and one weight 26 was mounted on axle 32. However, for the sake of clearness of understanding in the following discussion of the apparatus 10 and its operation, the weights 22, 24, 26 will be referred to in the singular. The three axles 28, 30, 32 extend outwardly from the flange 36A and through appropriate bearings 41 in the mounting plate 34 and their ends projecting outwardly from the opposite side of the mounting plate 34 from the mounting flange 36A of the conveyor deck 12 transversely of the conveyor deck 12. In operation, the mounting plate 34, the portion of the three axles 28, 30, 32 extending outwardly from the mounting plate 34, and the various other components of the invention to be discussed hereinafter, such as drive sheaves 38, 40, 42, phase angle adjustment plate 54, and driven pulley 44, which are structurally associated with the extending ends of the three axles 28, 30, 32 remain stationary while the conveyor deck 12, the portion of the three axles 28, 30, 32 extending between the flanges 36A and 36C of the deck, and the eccentric weights 22, 24, 26 vibrate. In order to compensate for this operating condition, it is contemplated that each of these axles 28, 30, 32 be split into two sections with a floating shaft universal joint 45 interconnecting them. Each axle 28, 30, 32 has a drive sheave 38, 40, 42, respectively, attached to its projecting end outboard of the mounting plate 34, so that each of the axles rotates with its sheaves. A driven pulley 44 is also attached to the extending end of the intermediate axle 30 outboard of the drive sheave 40 so that the intermediate axle 30 rotates with the driven pulley 44. A drive motor 46 is located, for example, on the conveyor support frame 18 and includes a drive pulley 48 on its output shaft. The drive pulley 48 is drivingly interconnected to the driven pulley 44 on the intermediate axle 30 by a drive belt 50, which is looped or trained about the driven pulley 44 and drive pulley 48. The vibratory drive system 20 further includes phase angle adjustment means, generally denoted as the numeral 52, for selectively varying the phase angle relationship between the outermost eccentric weights 22 and 26 and the intermediate eccentric weight 24 either while the drive motor 46 is shut down (not operating), and more importantly to the versality provided by the drive system 20 of the invention, as the drive motor 46 is operating rotating the eccentric weights 22, 24, 26. It is an objective of the phase angle adjustment means 52 to change the phase angle of the common or resultant force "R" (to be hereinafter discussed) by changing the phase angle at which the force vectors of the weights 22, 24, 26 are in a common direction, or phase angle, as the weights rotate. Therefore, the angle of attack, or phase angle, of the resultant force vector generated by the force vectors of the weights 22, 24, 26 relative to the conveyor deck 12 is changed. The phase angle adjustment means 52 is shown as comprising a phase angle adjustment plate 54 journal mounted to the intermediate axle 30 by, for example, a bearing 43 so that the adjustment plate 54 is movable through an arc centered on the intermediate axle 30. The adjustment plate 54 includes two idler sheaves 56 and 58 mounted thereto for rotation and located to either transverse side of and above the intermediate axle 30 with their axes of rotation parallel to each other and parallel to the intermediate axle 30 and, therefore, also parallel to the outermost axles 28 and 32. A belt tensioning sheave 62 is journal mounted to the mounting plate 34 beneath the intermediate axle 30 with its axis of rotation parallel to the intermediate axle 30. The first sheave 38 on the first one of the outermost axles 28, the second sheave 40 on the intermediate axle 30, the third sheave 42 on the second one of the outermost axle 32, the first and second idler sheaves 56, 58, respectively, on the mounting plate 54, and the tensioning sheave 62 are all drivingly interconnected by a driven belt 60. The drive belt 60 is disposed relative to the first drive sheave 38, the second drive sheave 40, the first idler sheave 56, the second idler sheave 58 and the tensioning sheave 62 with its inside surface in contact with these sheaves, and relative to the second drive sheave 40 with its outside surface in contact therewith so that the drive belt 60 follows a serpentine path. Therefore, the outermost axles 28 and 32 and the weights 22 and 24, respectively, mounted thereon, will be rotatably driven in a first direction, for example counter-clockwise, and the intermediate axle 30 and the weight 26 mounted thereon will be rotatably driven in a second direction opposite to the first direction, for example, clockwise.

The tensioning sheave 62 is selectively movable upwardly and downwardly, as mentioned above, to maintain a desired tension on the driven belt 60 as may be required t keep it properly tracking on the sheaves of the drive system 20. This can be accomplished in various ways, such as, for example using a standard, known spring-loaded tensioning pulley.

With continued reference to FIGS. 1, 2 and 3, the phase angle adjustment plate 54 is caused to selectively move through an arc centered on the intermediate axle 30 by adjustment plate moving means, generally denoted as the numeral 66. As shown, the adjustment plate moving means 66 includes a horizontally disposed threaded rod 68 extending perpendicular to the axles 28, 30, 32. The threaded rod 68 is threadably received in a threaded fitting 70 at the top end of an upstanding vertical bracket 72 which is attached at its bottom to the support frame 18. The distal end of the threaded rod 68 is received in a bearing fitting 74 at the top end of the adjustment plate 54. A crank arm or wheel 76 is attached to the proximal end of the threaded rod 68 adjacent the vertical bracket 72 for turning the threaded rod 68 in appropriate directions to selectively longitudinally move toward the adjustment plate 54 and longitudinally move away from the adjustment plate 54. Therefore, as the threaded rod 68 moves longitudinally toward the adjustment plate 54, it coacts with the bearing fitting 74 to push the adjustment plate 54 in a counter-clockwise arc motion centered on the intermediate axle 30, and as the threaded rod 68 moves longitudinally away from the adjustment plate 54, it coacts with the bearing fitting to pull the adjustment plate 54 in a clockwise arc motion centered on the intermediate axle 30. While the adjustment plate moving means 66 is illustrated as being a threaded rod 68, it should be clearly understood that various other devices can be used instead as the adjustment plate moving means 66. Various such other devices include, for example, a motor driven clutch device, or fluid-operated cylinder device, and the like.

Figure 9:
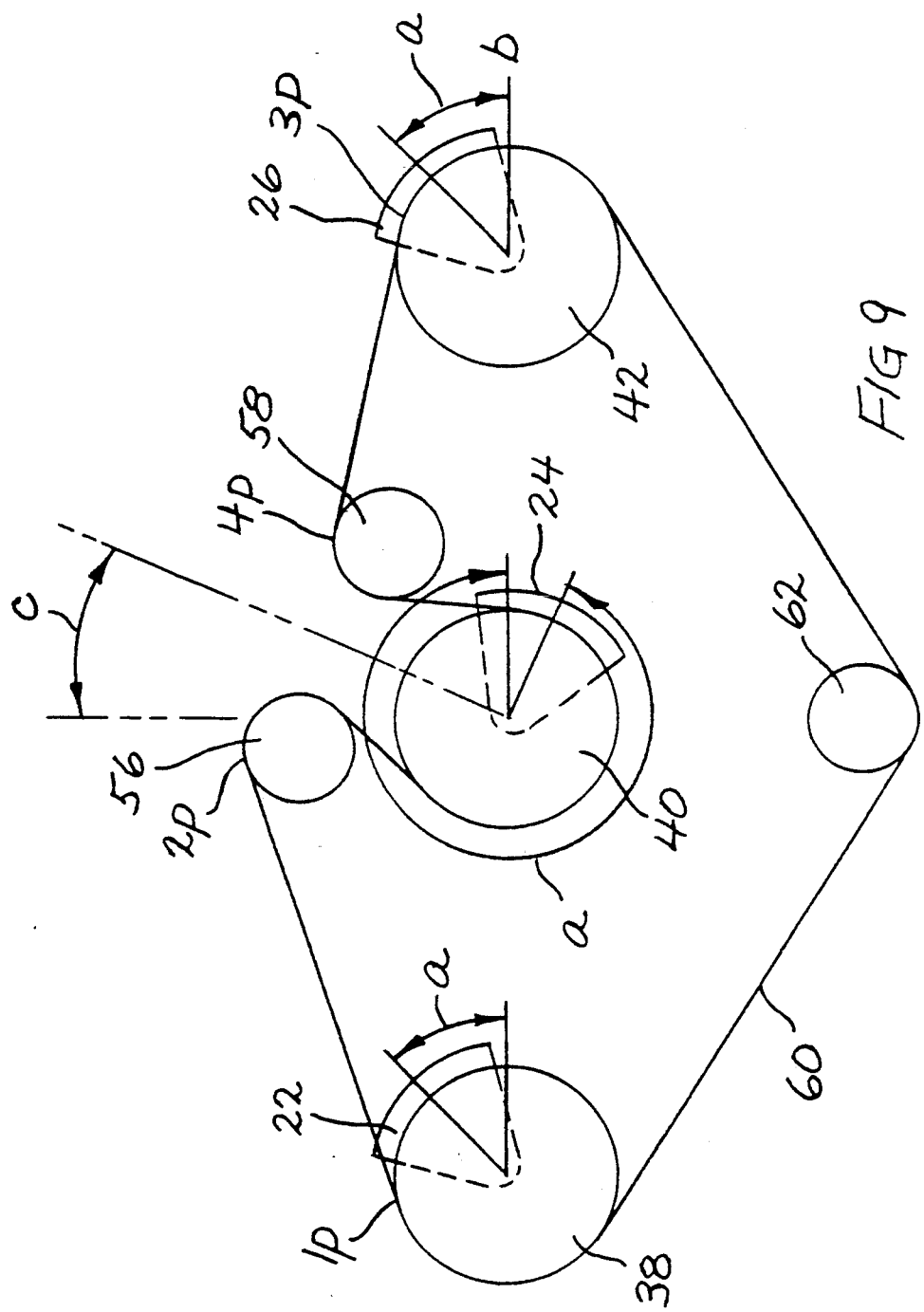
FIG. 9 is a schematic representation of the vibratory drive system of FIG. 7 of the present invention in a second adjusted operating position.

With reference to FIGS. 4, 5, 6 and 7, 8, 9, there is shown in schematic format, the effects of the above-described movements of the phase angle adjustment plate 54 of the phase angle adjustment means 52. FIGS. 4 and 7 show the position of the phase angle adjustment plate 54, and the rotational position or phase angle "a" relationship of the three eccentric weights 22, 24, 26 relative to the imaginary horizontal datum line "b", when the phase angle adjustment means 52 is in an initial or neutral position. FIGS. 5 and 8 each show the position of the phase angle adjustment plate 54, and the rotational position or phase angle "a" relationship of the three weights 22, 24, 26 relative to the imaginary horizontal datum line "b" when the phase angle adjustment means 52 is in a first arcuately displaced position wherein the adjustment plate 54 has been moved in a counter-clockwise direction from the initial position. FIGS. 6 and 9 each show the position of the phase angle adjustment plate 54, and the rotational position or phase angle "a" relationship of the three eccentric weights 22, 24, 26 relative to the imaginary datum line "b" when the phase angle adjustment means 52 is in a second arcuately displaced position wherein the adjustment plate 54 has been moved in a clockwise direction from the initial position.

As the three eccentric weights 22, 24, 26 of the vibratory drive system rotate about the axis of their respective axles 28, 30, 32, the weights will each generate a linear force vector at a selected phase angle "a" relative to, for example, the imaginary datum line "b". In the following discussion, because it is the linear force vectors generated by the rotating weights 22, 24, 26 which provide the vibrating forces of the linear drive system, the force vectors will be referred to instead of the weights 22, 24, 26. The linear force vector generated by the rotating weight 22 is denoted 22a, the linear force vector generated by the rotating weight 24 is denoted 24a, and the linear force vector generated by the rotating weight 26 is denoted 26a. Also, therefore, in the following discussion, the phase angle "a" will be described in conjunction with these force vectors 22a, 24a, 26a instead of the corresponding eccentric weights 22, 24, 26.

The amount by which the phase angle "a" of the force vector 24a generated by the intermediate weight 24 changes as the phase angle adjustment plate 54 is moved, either clockwise or counter-clockwise as described above, through any given angle of displacement from the initial position is a function of the belt path geometry defined by the drive sheaves 38, 40 and 42, and the idler sheaves 56 and 58. The various design features of the phase angle adjustment means 52 which affect the belt path geometry are, for example, the relative sizes of the drive sheaves 38, 40 and 42, the idler sheaves 56 and 58. For example, with reference to FIGS. 4, 5 and 6, in one embodiment, with given centerline distances between all the sheaves, the sheaves 38, 40 and 42 are 9 inches in diameter and the idler sheaves 56 and 58 are 6 inches in diameter. In the initial or neutral position of the phase angle adjustment means 52 shown in FIG. 4, the distance between the driven belt tangent point 1p on the first sheave 38 and the driven belt tangent point 2p on the idler sheave 56 is 13.6 inches, and the distance between the driven belt tangent point 3p on the third sheave 42 and the driven belt tangent point 4p on the other idler sheave 58 is also 13.6 inches. In FIG. 4, the initial phase angle "a" of each of the three force vectors 22a, 24a, 26a, as measured from the imaginary datum line "b" is 45° in the first quadrant of an imaginary unit circle centered on the axles 28, 30, 32, respectively. In FIG. 5, wherein the phase angle adjustment means 52 has been pivoted counter-clockwise through an angle "c" of 20° from the initial position of FIG. 4, the distance between the driven belt tangent point 1p on the first sheave 38 and the driven belt tangent point 2p on the idler sheave 56 is 9 inches, and the distance between the driven belt tangent point 3p on the third sheave 42 and the driven belt tangent point 4p on the other idler sheave 58 is 18.1 inches. The effective shortening of the portion of the driven belt 60 between the driven belt tangent points 1p and 2p, and the effective lengthening of the portion of the driven belt 60 between the driven belt tangent points 3p and 4p results in a change of the phase angle "a" of the force vector 24a from an initial phase angle of 45° in the first quadrant of a unit circle centered on the axle 30 of the intermediate weight 24 shown in FIG. 4, to a phase angle of 135.5° in the second quadrant of the unit circle as shown in FIG. 5, a change of 45° in the phase angle "a" of the linear force vector 24a, while the force vectors 22a and 26a remain at a phase angle of 45° in the first quadrant. In FIG. 6, wherein the phase angle adjustment means 52 has been pivoted clockwise through an angle "c" of 20° from the initial position of FIG. 4, the distance between the driven belt tangent point 1p on the first sheave 38 and the driven belt tangent point 2p on the idler sheave 56 is 18.1 inches and the distance between the driven belt tangent point 3p on the third sheave 42 and the driven belt tangent point 4p on the idler sheave 58 is 9 inches. The effective lengthening of the portion of the driven belt 60 between the driven belt tangent points 1p and 2p, and the effective shortening of the portion of the driven belt 60 between the driven belt tangent points 3p and 4p result in a change of the phase angle "a" of the force vector 24a from an initial phase angle of 45° in the first quadrant of the unit circle shown in FIG. 4, to 314.5° in the fourth quadrant of the unit circle as shown in FIG. 6, a change also of 90.5° in the phase angle "a" of the linear force vector 24a but in the opposite direction from that of FIG. 5, while the force vectors 22a and 26a remain at a phase angle of 45° in the first quadrant. By contrast, reference is now made to the embodiment of FIGS. 7, 8, and 9, wherein with the centerline distances between all of the various sheaves are the same as in the embodiment of FIGS. 4, 5 and 6, but the sheaves 38, 40 and 42 are 12 inches in diameter and the idler sheaves 56 and 58 are 6 inches in diameter. In the initial or neutral position of the phase angle adjustment means 52 shown in FIG. 7, the distance between the driven belt tangent point 1p on the first sheave 38 and the driven belt tangent point 2p on the idler sheave 56 is 14.7 inches, and the distance between the driven belt tangent point 3p on the third sheave 42 and the driven belt tangent point 4p on the other idler sheave 58 is also 14.7 inches. In FIG. 7, the initial phase angle "a" of each of the three force vectors 22a 24a, 26a, as measured from the imaginary datum line "b" is 45° in the first quadrant of the unit circle. In FIG. 8, wherein the phase angle adjustment means 52 has been pivoted counter-clockwise through a phase angle "c" of 20° from the initial position of FIG. 7, the distance between the driven belt tangent point 1p on the first sheave 38 and the driven belt tangent point 2p on the idler sheave 56 is 10 inches, and the distance between the driven belt tangent point 3p on the third sheave 42 and the driven belt tangent point 4p on the idler sheave 58 is 19.2 inches. The effective shortening of the portion of the driven belt 60 between the driven belt tangent points 1p and 2p, and the effective lengthening of the portion of the driven belt 60 between the driven belt tangent points 3p and 4p result in a change of the phase angle "a" of the force vector 24a from an initial phase angle of 45° in the first quadrant of the unit circle to a phase angle of 118° in the second quadrant of the unit circle as shown in FIG. 8, a change of 73° in the phase angle "a" of the linear force vector 24a while the force vectors 22a and 26a remain at a phase angle of 45° in the first quadrant. In FIG. 9, wherein the phase angle adjustment means 52 has been pivoted clockwise through an angle "c" of 20° from the initial position of FIG. 7, the distance between the driven belt tangent point 1p on the first sheave 38 and the driven belt tangent point 2p on the idler sheave 56 is 19.2 inches and the distance between the driven belt tangent point 3p on the third sheave 42 and the driven belt tangent point 4p on the idler sheave 58 is 10 inches. The effective lengthening of the portion of the driven belt 60 between the driven belt tangent points 1p and 2p, and the effective shortening of the portion of the driven belt 60 between the driven belt tangent points 3p and 4p result in a change of the phase angle "a" of the force vector 24a from an initial phase angle of 45° in the first quadrant of the unit circle shown in FIG. 7 to 331.7° in the fourth quadrant of the unit circle as shown in FIG. 9, a change also of 73.3° in the phase angle "a" of the linear force vector 24a but in the opposite direction from that of FIG. 8, while the force vectors 22a and 26a remain at the phase angle of 45° in the first quadrant.

FIGS. 10a-10h, 11a-11h, 12a-12h, 13a-13j, and 14a-14h illustrate in vectorial format a vibratory drive system 20 of the present invention which provides a linear vibrating force generation, or drive force, to the conveyor apparatus 10. This is accomplished by sizing the weights 22 and 26 relative to the intermediate weight 24 such that the sum of the forces generated by the weights 22 and 26 equals the force generated by the intermediate weight 24. Therefore, as can be seen in FIGS. 10a-10h, 11a-11h, 12a-12h, 13a-13j, and 14a-14h and as will become evident from the following discussion of these figures, as the weights 22, 24, 26 rotate the phase angle, or angle of attack, of the resultant force vector R is constant as the resultant force vector "R" varies in magnitude. Therefore, the resultant force vector "R" provides a linear vibrating force generation, or drive force, to the conveyor apparatus 10.

As will become more clear from the following discussion, an object which is satisfied by the present invention is to change the phase angle at which the vectors 22a, 24a, 26a are common or at which the vectors 22a, 24a, 26a are in alignment during rotation of the weights 22, 24, 26 and, thereby, satisfy a further objective of the present invention to selectively change the angle of attack, or phase angle, of the resultant force vector "R", which is the linear vibratory force imported to the conveyor apparatus 10, relative to the conveyor deck 12. Further, it should be clearly understood in the following discussion that the resultant force "R" is a linear force which sinusoidally varies in magniture, but in a constant direction.

FIGS. 10a-10h illustrate in vectorial format the sequential results on the vectors 22a, 24a, 26a of the weights 22, 24, 26 respectively, and the resultant vibratory force "R" generated thereby and imparted to the conveyor apparatus 10 when operating the vibratory drive system 20 with the phase angle adjustment means 52 in the initial position of FIG. 3. In the following discussion, let us assume that the outermost weights 22 and 36 each generate a force of 25 pounds and the intermediate weight 24 generates a force of 50 pounds. The circles circumscribing each of the weights 22, 24, 26 in FIGS. 10a-10h do not indicate rotation of the weights 22, 24, 26 but are only imaginary circles depicting the unit circles mentioned in the following discussion to aid in identifying the quadrant positions of the force vectors 22a 24a, 26a generated by the weights 22, continuously rotate. As can be seen in FIG. 10a, at a time equal to zero, the vectors 22a, 24a, 26a are each at an angle of 45° in the first quadrant, and the resultant vibratory force vector "R" generated thereby is at a maximum of 100 pounds, an angle of attack or phase angle of 45° angle in the first quadrant. As can be seen in FIG. 10b, as the weights 22, 24, 26 continue to rotate, and at a time equal to $\pi/4$, or 45° of rotation from time equal to zero, the vectors 22a and 26a are each at a quadrantal angle of 90°, the vector 24a is at a quadrantal angle of zero degrees, and the resultant vibratory force vector "R" is, therefore, at an angle of attack or phase angle of 45° in the first quadrant at a force of about 71 pounds. As can be seen in FIG. 10c, as the weights 22, 24, 26 continue to rotate, and at a time equal to $\pi/2$, or 90° of rotation from time equal to zero, the vectors 22a and 26a are each at an angle of 135° in the second quadrant, vector 24a is at an angle of 315° in the fourth quadrant, and the resultant vibrating force vector "R" is, therefore, zero because the sum of the vectors 22a and 26a are equal and opposite to the vector 24a and, therefore, cancel each other. As can be seen in FIG. 10d, as the weights 22, 24, 26 continue to rotate, and at a time equal to $3/4\pi$, or 135° of rotation from the time equal to zero, the vectors 22a and 26a are each at a quadrantal angle of 180°, the vector 24a is at a quadrantal angle of 270°, and the resultant force vector "R" is, therefore, at an angle of attack of 225° in the third quadrant at a force of 71 pounds. As can be seen in FIG. 10e, as the weights 22, 24, 26 continue to rotate, and at a time equal to $\pi$, or 180° of rotation from the time equal to zero, the vectors 22a, 24a, 26a are each at an angle of 225° in the third quadrant and the resultant force vector "R" is, therefore, at a maximum of 100 pounds at an angle of attack 225 degrees in the third quadrant. As can be seen in FIG. 10f, as the weights 22, 24, 26 continue to rotate, and at a time equal to $5/4\pi$, or 225° of rotation from time equal to zero, the vectors 22a and 26a are each at a quadrantal angle of 270°, the vector 24a is at a quadrantal angle of 180°, and the resultant force vector "R" is, therefore, at an angle of attack of 225° in the third quadrant at a force of 71 pounds. As can be seen in FIG. 10g, as the weights 22, 24, 26 continue to rotate, and at a time equal to $3/2\pi$, or 270° of rotation from the time equal to zero, the vectors 22a and 26a are each at an angle of 315° in the fourth quadrant, the vector 24a is at an angle of 135° in the second quadrant, and the resultant force vector "R" is, therefore, zero because the sum of the vectors 22a and 26a are equal and opposite to the vector 24a and cancel each other. As can be seen in FIG. 10h, as the weights 22, 24, 26 continue to rotate, and at a time equal to $7/4\pi$, or 315° of rotation from the time equal to zero, the vectors 22a and 26a are each at a quadrantal angle of zero degrees, the vector 24a is at a quadrantal angle of 90°, and the resultant force vector "R" is, therefore, at a 45° angle of attack in the first quadrant at a force of about 71 pounds. In sequentially reviewing FIGS. 10a through 10h, it can be seen that as the weights 22, 24, 26 rotate, they generate a linear resultant force "R" which sinusoidly varies in magniture in a constant direction. Therefore, the stroke angle of the linear vibrating drive system relative to the conveying deck 16 is also linear at an angle of 45° to the horizontal and varies from a maximum in one direction at an angle of 45° in the first quadrant to a maximum in the opposite direction at an angle of 135° in the third quadrant to convey material on the conveyor deck 16 from the inlet end 14 toward the outlet end 16. With reference to FIG. 10a, as the weights 22, 24, 26 rotate, a maximum value of the generated linear resultant vibratory force vector "R" is 100 pounds at a phase of 45° in the first quadrant in the forward conveying direction occurs at the time when the force vectors 22a, 24a, 26a are at an angle of 45° in the first quadrant such that these force vectors 22a, 24a, 26a are additive. Therefore, the vertical force vector "V" of the resultant force "R" is at a phase angle of 45° in the first quadrant at about 71 pounds and the horizontal or conveying force vector is also about 71 pounds.

Figure 11A:
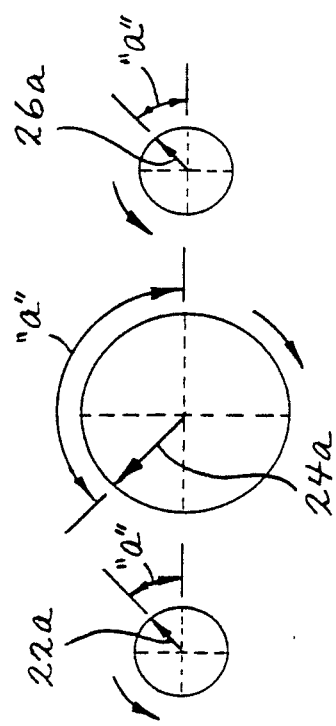
Figure 11B:
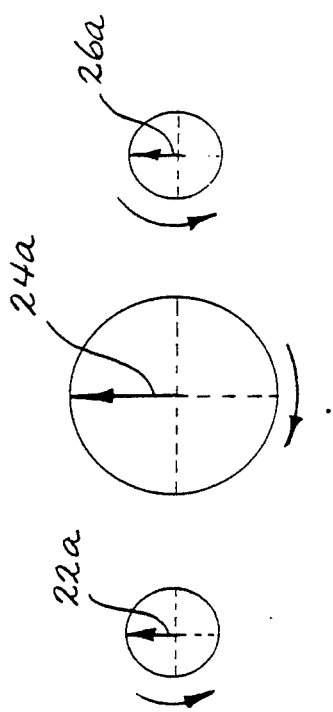

FIGS. 11a-11h illustrate, in vectorial format, the sequential results of the vectors 22a, 24a, 26a of the weights 22, 24, 26, respectively, and the resultant vibratory force "R" generated thereby and imparted to the conveyor apparatus 10 when operating the vibratory drive system 20 with the phase angle adjustment means 52 in the first position of FIG. 5 shifted 20° counter-clockwise from the initial position. As can be seen in FIG. 11a, at a time equal to zero, the vectors 22a, 26a of the outer-most weights 22, 26 are at a phase angle "a" of 45° in the first quandrant, the vector 24a of the intermediate weight 24 is at a phase angle "a" of 135° in the second quandrant, and the resultant vibratory force "R" is about 70.7 pounds at a quadrant angle of 90°. As can be seen in FIG. 11b, as the weights 22, 24, 26 continue to rotate, and at a time equal to $\pi/4$, or 45° of rotation from the time equal to zero, the phase angles "a" of vectors 22a and 26a are each at quadrantal angle of 90°, the vector 24a is also at a phase angle "a" of a quadrantal angle of 90°, and the resultant vibratory force vector "R" is, therefore, 100 pounds at a quadrantal angle of 90°. As can be seen in FIG. 11c, as the weights 22, 24, 26 continue to rotate, and at at time equal to $\pi/2$, or 90° of rotation from time equal to zero, the vectors 22a and 26a are at a phase angle "a" of 135° in the second quadrant and the vector 24a is at a phase angle "a" of 45° in the first quadrant, and the resultant vibratory force vector "R" is, therefore, about 70.7 at a quadrantal angle of 90°. As can be best seen in FIG. 11d as the weights 22, 24, 26 continue to rotate, and at a time equal to 3/4π, or 135° of rotation from the time equal to zero, the phase angle "a" of the vectors 22a and 26a are at a quadrantal angle of 180° and the phase angle "a" of the vector 24a is at a quadrantal angle of 90°, and the resultant force "R" is, therefore, zero because the sum of the vectors 22a and 26a are equal and opposite to the vector 24a and cancel each other out. As can be best seen in FIG. 11e, as the weights 22, 24, 26 continue to rotate, and at a time equal to π, or 180° of rotation from time equal to zero, the vectors 22a and 26a are at a phase angle "a" of 225° in the third quandrant, the vector 24a is at a phase angle "a" of 315° in the fourth quadrant, and the vibratory resultant force vector "R" is, therefore, about 70.7 pounds at a quadrant angle of 270°. As can be best seen in FIG. 11f, as the weights 22, 24, 26 continue to rotate, and at a time equal to 5/4π, or 225° of rotation from time equal to zero, the phase angle "a" of the vectors 22a and 26a are at a quandrantal angle of 270°, the vector 24a is at a quadrantal angle of 270°, and the vibratory resultant vector "R" is, therefore, 100 pounds at a quadrantal angle of 270°. As can be best seen in FIG. 11g, as the weights 22, 24, 26 continue to rotate, and at a time equal to 3/2π, or 270° of rotation from time equal to zero, the vectors 22a and 26a are at a phase angle "a" of 315° in the fourth quadrant, the vector 24a is at a phase angle "a" of 225° in the third quadrant, and the vibratory resultant force "R" is, therefore, 70.7 pounds at a quadrantal angle of 270°. As can best be seen in FIG. 11h, as the weights 22, 24, 26 continue to rotate, and at a time equal to 7/4π, or 315° of rotation from time equal to zero, the phase angle "a" of each of the vectors 22a and 26a are at a quadrantal angle of zero degrees, the vector 24a is at a phase angle "a", at a quadrantal angle of 180°, and the vibrating force vector "R" is, therefore zero because the sum of the vectors 22a and 26a are equal and opposite to the vector 24a and cancel each other out.

Figure 12A:
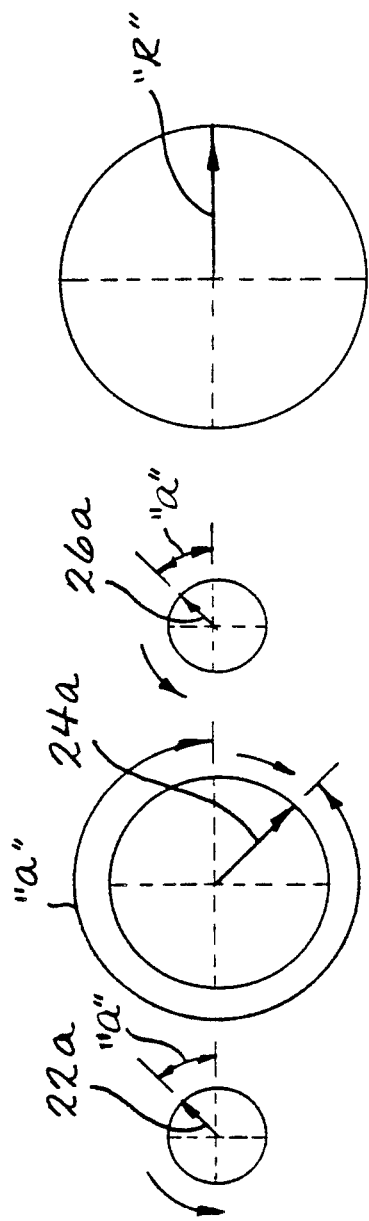
Figure 12B:
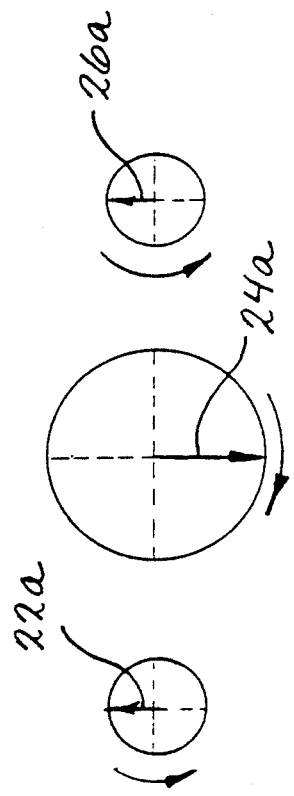
Figure 12C:
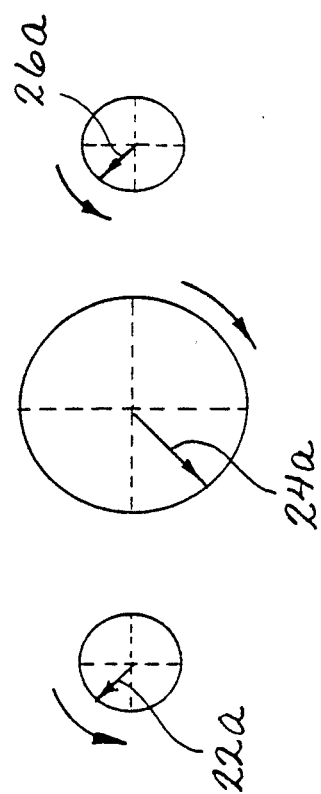
Figure 12D:
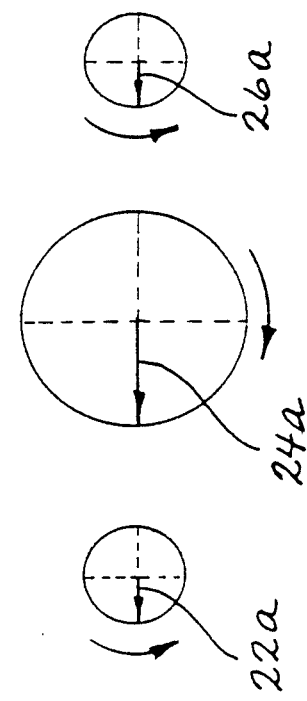
Figure 12E:
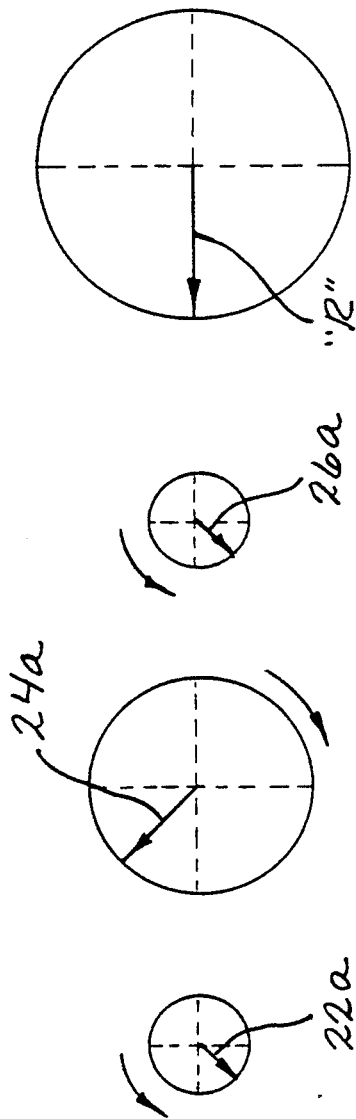
Figure 12F:
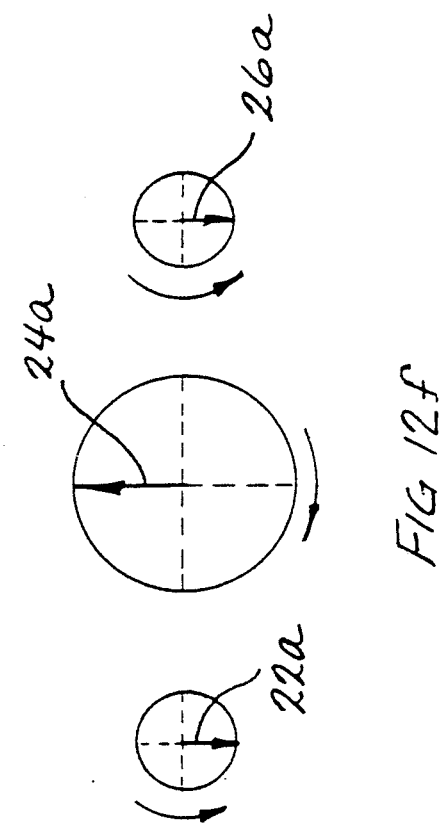

FIGS. 12a-12h illustrate in vectorial format, the sequential results of the vectors 22a, 24a, 26a of the weights 22, 24, 26, respectively, and the resultant vibratory force vector "R" generated thereby and imparted to the conveyor apparatus 10 when operating the vibratory drive system 20 with the phase angle adjustment means 52 in the second position of FIG. 6 shifted 20° clockwise from the initial position. As can be seen in FIG. 12a, at a time equal to zero, the vectors 22a and 26a of the outer-most weights 22 and 26 are at a phase angle "a" of 45° in the first quadrant, the vector 24a of the intermediate weight 24 is at a phase angle "a" of 315° in the fourth quadrant, and the resultant vibratory force vector "R" is about 70.7 pounds at a quadrantal angle of zero degrees. As can be seen in FIG. 12b, as the weights 22, 24, 26 continue to rotate, and at a time equal to π/4, or 45°, the phase angle "a" of the vectors 22a and 26a are each at a quadrantal angle of 90°, the phase angle "a" of vector 24a is a quadrantal angle of 180°, and the resultant vibratory force vector "R" is, therefore, zero. As can be seen in FIG. 12c, as the weights 22 24 26 continue to rotate, and at a time equal to π/2, or 90° of rotation from time equal to zero, the vectors 22a and 26a are at a phase angle "a" of 135° in the second quadrant, the vector 24a is at a phase angle of 225° in the third quadrant, and the resultant vibratory force vector "R" is, therefore, about 70.7 pounds at a quadrant angle of 180. As can be best seen in FIG. 12d, as the weights 22, 24, 26 continue to rotate, and at a time equal to 3/4π, or 135° of rotation from time equal to zero, the phase angle "a" of the vectors 22a and 24a are at a quadrantal angle of 180 °, the phase angle "a" of the vector 24a is also at a quadrantal angle of 180°, and the resultant vibrating force vector "R" is, therefore, about 100 pounds at a quadrantal angle of 180°. As can be best seen in FIG. 12e, as the weights 22, 24, 26 continue to rotate, and at a time equal to π, or 180° of rotation from the time equal to zero, the phase angles "a" of the vectors 22a and 26a are 225° in the third quadrant, the vector 24a is at a phase angle of 135° in the second quadrant, and the resultant vibrating force vector "R" is, therefore, about 70.7 pounds at a quadrantal angle of 180°. As can be best seen in FIG. 12f, as the weights 22, 24, 26 continue to rotate, and at a time equal to 5/4π, or 225° of rotation from time equal to zero, the phase angle "a" of the vectors 22a and 24a are at a quadrantal angle of 270°, the phase angle of the vector 24a is at a quadrant angle of 90°, and the resulting vibrating force vector "R" is zero because the sum of the force vectors 22a and 26a and the force vector 24a cancel out. As can be best seen in FIG. 12g, as the weights 22, 24, 26 continue to rotate, and at a time equal to 3/2π, or 270° of rotation from time equal to zero, the phase angles "a" of vectors 22a and 26a are at 315° in the fourth quadrant, the vector 24a is at a phase angle of 45° in the first quadrant, and the vibrating resultant force vector "R" is, therefore, about 70.7 pounds at a quadrantal angle of zero degrees. As can be best seen in FIG. 12h, as the weights 22, 24, 26 continue to rotate, and at a time equal to 7/4π, or 315° of rotation from time equal to zero, the phase angles "a" of the vectors 22a and 24a are each at a quadrantal angle of zero degrees, the phase angle "a" of the vector 24a is at a quadrantal angle of zero degrees, and the resultant vibratory force vector "R" is, therefore, about 100 pounds at a quadrantle angle of zero degrees.

By comparing FIGS. 10a-10h to 11a-11h, it can be seen that by moving the phase angle adjustment means 52 from the initial position of FIG. 4, whereat the material on the conveyor deck 12 is moved from the inlet end 14 to the outlet end 16, to a first position of 20° counter-clockwise displacement of FIG. 5, the conveying speed or motion of the conveyor apparatus 10 goes to zero, that is it does not convey material, because there is no horizontal resultant force vector "R" and because the only resultant force "R" is a linear vertical vibrating force vector "R" the material on the conveyor deck 12 is shaken in a vertical direction.

By comparing FIGS. 10a-10h to FIGS. 12a-12h, it can be seen that by moving the phase angle adjustment means 52 from the initial position of FIG. 4, whereat the material on the conveyor deck 12 is moved from the inlet end 14 to the outlet end 16, to the second position of 20° clockwise of FIG. 6, the net conveying speed or motion is zero because the only resultant force vector "R" is an alternating linear horizontal force and there is no vertical resultant force component and, therefore, the material on the conveyor deck 12 is shaken back and forth in a horizontal direction.

Figure 13A:
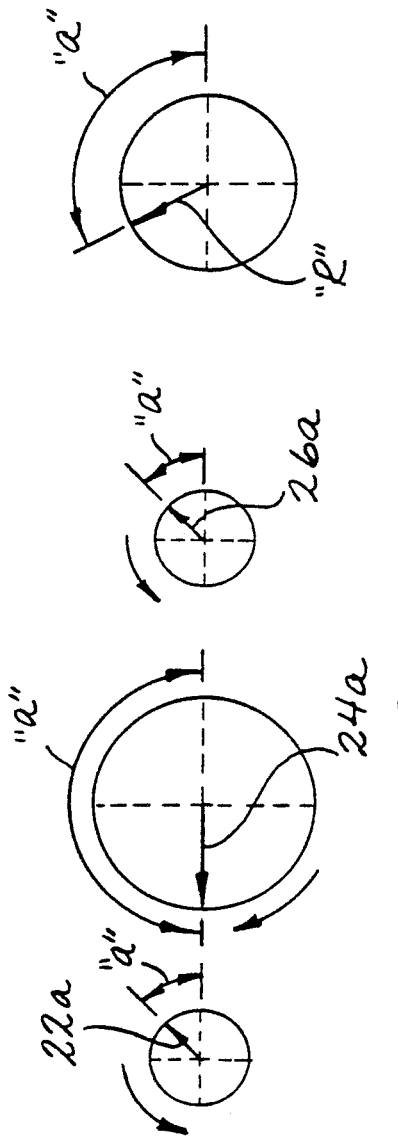
Figure 13B:
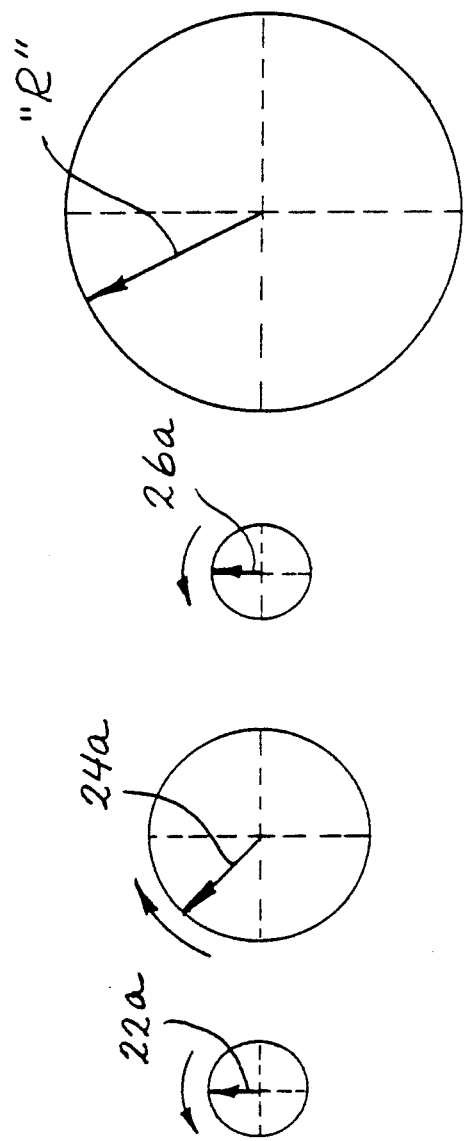

FIGS. 13a-13j illustrate, in vectorial format, the sequential results of the vectors 22a, 24a, 26a of the weights 22, 24, 26, respectively, and the resultant vibratory force "R" generated thereby imparted to the conveying apparatus 10 when operating the vibratory drive system 20 with the phase angle adjustment means 52 in the first position of FIG. 5 shifted 30° counter-clockwise from the initial position. As can be seen in FIG. 13a, at a time equal to zero, the vectors 22a, 26a of the outer-most weights 22, 26 are at a phase angle "a" of 45° in the first quadrant, the phase angle of the vector 24a of the intermediate weight 24 is at a quadrantal angle of 180°, and the resultant vibratory force "R" is, therefore, about 38.3 pounds at a phase angle of about 112.5° in the second quadrant. As can be seen in FIG. 13b, as the weights 22, 24, 26 continue to rotate, and at a time equal to π4 or 45° of rotation from the time equal to zero, the phase angle "a" of the vectors 22a, 26b are each at a quadrantal angle of 90°, the vector 24a is at a phase angle "a" of 135° in the second quadrant, and the resultant force vector "R" is, therefore, about 92.4 pounds at a phase angle "a" of about 112.5° in the second quadrant. As can be seen in FIG. 13c, as the weights 22, 24, 26 continue to rotate, and at a time equal to 67.5° of rotation from the time equal to zero, the vectors 22a, 26a are each at a phase angle "a" of about 112.5° in the second quadrant, the vector 24a is at a phase angle "a" of about 112.5° in the second quadrant, and the phase angle "a" of about 112.5° in the second quadrant. As can be seen in FIG. 13d, as the weights 22, 24, 26 continue to rotate, and at a time equal to π/2, or 90° of rotation from the time equal to zero, the vectors 22a, 26a are at a phase angle "a" of 135° in the second quadrant, the phase angle "a" of the vector 24a is at a quadrantal angle of 90°, and the resultant vibratory force "R" is, therefore, about 92.4 pounds at a phase angle of about 112.5° in the second quadrant. As can be seen in FIG. 13e, as the weights continue to rotate, and at a time equal to 3/4π, or 135° of rotation from the time equal to zero, the phase angles "a" of the vectors 22a and 26a are each at a quadrantal angle of 180°, the phase angle "a" of the vector 24a is 45° in the first quadrant, and the resultant vibratory force "R" is, therefore, about 38.3 pounds at a phase angle of about 112.5° in the second quadrant. As can be seen in FIG. 13f, as the weights 22, 24, 26 continue to rotate, and at a time equal to π, or 180° of rotation from the time equal to zero, the vectors 22a and 26a at a phase angle "a" of 225° in the third quadrant, the phase angle "a" of the vector 24a is at a quadrantal angle of zero degrees, and the vibrtatory resultant force vector "R" is, therefore, about 38.3 pounds at a phase angle of about 292.5° in the fourth quadrant. As can be seen in FIG. 13g, as the weights continue to rotate, and at a time equal to 5/4π, or 225° of rotation from the time equal to zero, the phase angles "a" of vectors 22a and 26a are at a quadrantal angle of 270°, the vector 24a is at a phase angle "a" of 325° in the fourth quadrant, and the vibratory resultant force "R" is, therefore, about 92.4 pounds at a phase angle of about 292.5° in the fourth quadrant. As can be seen in FIG. 13h, as the weights 22, 24, 26 continue to rotate, and at a time equal to 247.5° of rotation from the time equal to zero, the vectors 22a, 26a are each at a phase angle "a" of about 292.5° in the fourth quadrant, the vector 24a is at a phase angle "a" of about 292.5° in the fourth quadrant, and the resultant vibratory force "R" is, therefore, 100 pounds at a phase angle "a" of about 292.5° in the fourth quadrant. As can be seen in FIG. 13i, as the weights 22, 24, 26 continue to rotate and at time equal to 3/2π, or 270° of rotation from the time equal to zero, the vectors 22a, 26a are each at a phase angle "a" of 315° in the fourth quadrant, the phase angle "a" of the vector 24a is at a quadrantal angle of 270°, and the vibratory force vector "R" is, therefore, about 92.4 pounds at a phase angle "a" of about 292.5° in the fourth quadrant. As can be seen in FIG. 13j, as the weights 22, 24, 26 continue to rotate, and at a time equal to 7/4π, or 315° of rotation from the time equal to zero, the phase angle "a" of each of the vectors 22a and 26a are at a quadrantal angle of zero degrees, the vector 24a is at a phase angle "a" of 225° in the third quadrant, and the vibratory force vector "R" is, therefore, about 38.3 pounds at a phase angle "a" of about 292.5°. With reference to FIG. 13c, as the weights 22, 24, 26 rotate, a maximum value of the generated linear resultant force vector "R" is 100 pounds in the reverse conveying direction occurs at the time when the force vectors 22a, 24a, 26a are at angle of about 112.5° in the second quadrant of the unit circle. Therefore, the vertical force vector "V" of the resultant force vector "R" is about 92.3 pounds and the horizontal or conveying force vector is about 38.3 pounds.

As is apparent from sequentially viewing FIGS. 13a–13j, and comparing these to FIGS. 10a–10h, it can be seen that by moving the phase angle adjustment means 52 from the initial position of FIG. 4, whereat the material on the conveyor deck 12 is moved from the inlet end 14 to the outlet end 16 of the conveyor deck 12, to a first position of 30° counter-clockwise displacement of FIG. 5 from the initial position of FIG. 4, the conveying motion of the conveyor apparatus 10 is reversed so that the material on the conveyor deck 12 is moved from the outlet end 16 to the inlet end 14 of the conveyor deck 12.

Figure 14G:
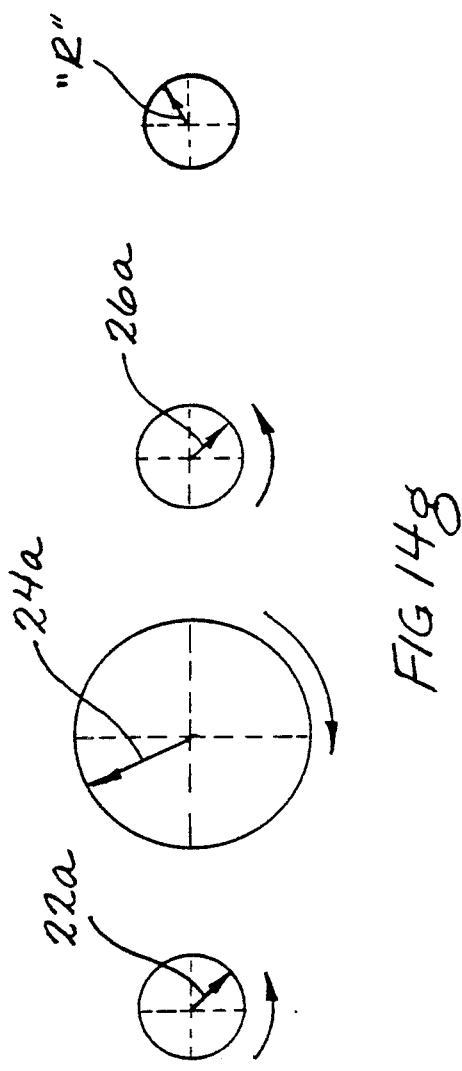
Figure 14H:
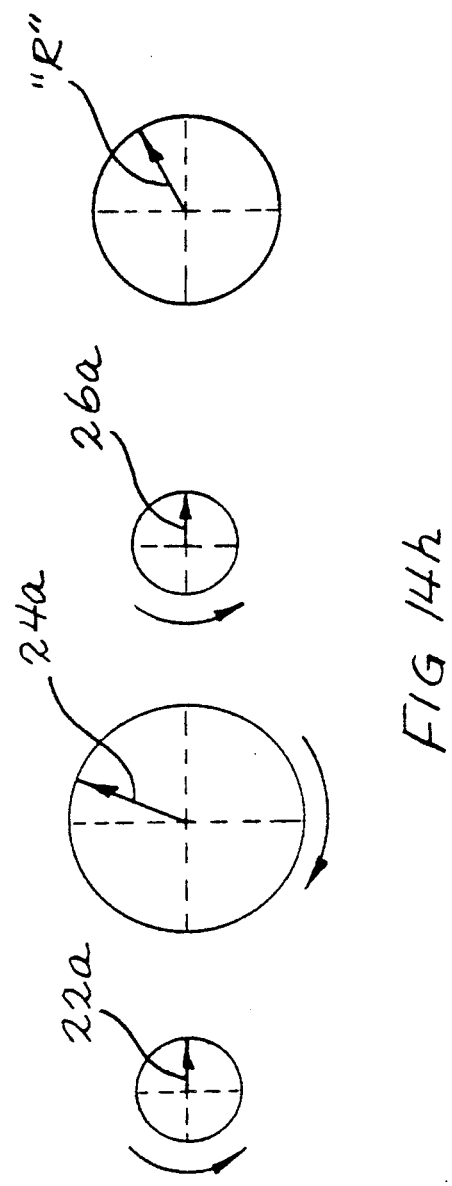

FIGS. 14a–14h illustrate in vectorial format, the sequential results of the vectors 22a, 24a, 26a of the weights, respectively, and the linear resultant vibratory force "R" generated thereby imparted to the conveyor apparatus 10 when operating the vibratory drive system 20 with the phase angle adjustment means 52 in the second position of FIG. 6 shifted through an angle "C" of 5° clockwise from the initial position. As can be seen in FIG. 14a, at a time equal to zero, the vectors 22a and 26a of the outermost weights 22 and 26 are at a phase angle "a" of 45° in the first quadrant, the vector 24a of the intermediate weight 24 is at a phase angle "a" of about 22.5° in the first quadrant, and the resultant vibratory force vector "R" is, therefore, about 98 pounds at a phase angle of about 33.7° in the first quadrant. As can be seen in FIG. 14b, as the weights 22, 24, 26 continue to rotate, and at a time equal to π/4 or 45° of rotation from the time equal zero, the phase angle "a" of each vector 22a and 26a are at a quadrantal angle of 90°, the vector 24a is at a phase angle "a" of about 337.5° in the fourth quadrant, and the resultant vibratory force "R" is about 55.6 pounds at a phase angle of about 33.7° in the first quadrant. As can be seen in FIG. 14c, as the weights continue to rotate, and at a time equal to π/2, or 90° of rotation from time equal to zero, the vectors 22a and 26a are at a phase angle "a" of 135° in the second quadrant, the vector 24a is at a phase angle "a" of 292.5 in the fourth quadrant, and the resultant vibratory force vector "R" is about 19.5 pounds at a phase angle of 213.7° in the third quadrant. As can be seen in FIG. 14d, the weights continue to rotate, and at a time equal to 3/4π, or 135° of rotation from time equal to zero, the phase angle "a" of the vectors 22a and 26a are at a quadrantal angle of 180°, the vector 24a is at a phase angle "a" of about 247.5° in the third quadrant, the resultant vibratory force vector "R" is about 83 pounds at a phase angle "a" of 213.7° in the third quadrant. As can be seen in FIG. 14e, as the weights continue to rotate, and at a time equal to $\pi$ or 180° of rotation from the time equal to zero, the phase angle of the vectors 22a and 26a are 225° in the third quadrant, the phase angle of the vector 24a is 202.5° in the third quadrant, and the resultant vibratory force vector "R" is about 98 pounds at a phase angle of 213.7° in the third quadrant. As can be seen in FIG. 14f, as the weights continue to rotate, and at a time equal to 5/4$\pi$ or 225° of rotation from the time equal to zero, the phase angle "a" of the vectors 22a and 26a are at a quadrantal angle of 270°, the vector 24a is at a phase angle "a" of about 157.5° in the second quadrant, and the resultant vibratory force vector "R" is about 55.6 pounds at a phase angle of 213.7° in the third quadrant. As can be seen in FIG. 14g, as the weights continue to rotate, and at a time equal to 3/2$\pi$ or 270° of rotation from the time equal to zero, the vectors 22a and 26a are at a phase angle "a" of 315° in the fourth quadrant, the vector 24a is at a phase angle of 112.5° in the second quadrant, and the resultant vibratory force vector "R" is about 19.5 pounds at a phase angle "a" of 33.7° in the first quadrant. As can be seen in FIG. 14h, as the weights continue to rotate, and at a time equal to 7/4$\pi$, or 315° of rotation from the time equal to zero, the phase angle "a" of the vectors 22a and 26a are at a quadrantal angle of 180°, the vector 24a is at a phase angle of 67.5° in the first quadrant, and the resultant vibratory force vector "R" is about 83 pounds at a phase angle of about 33.7° in the first quadrant. With reference to FIG. 14a, the value of the generated linear resultant force vector "R" is 98 pounds at a plase angle of 33.7° in the first quadrant of the unit circle or in the forward conveying direction and, therefore, the vertical force vector "V" of the resultant force vector "R" is about 54.4 pounds and the horizontal or conveying force vector is about 82 pounds.

As is apparent from sequentially viewing FIGS. 14a-14h, and comparing these to FIGS. 10a-10h, it can be seen that by advancing the phase angle adjustment means from the initial position of FIG. 4, whereat the material on the conveyor deck 12 is moved from the inlet end 14 to the outlet end 16 of the conveyor deck 12 at a selected speed, to a second position of 5° clockwise displacement of FIG. 6 from the initial position of FIG. 4, the conveying speed from the inlet end 14 to the outlet end of the conveyor deck 12 is increased.

FIGS. 15a-15h illustrate in vectorial format a vibratory drive system 10 of the present invention which provides an orbital or elliptical vibrating force generation, or drive force, to the conveyor apparatus 10. As compared to the linear drive force illustrated in FIGS. 10a-10h, 11a-11h, 12a-12h, 13a-13j, and 14a-14h discussesd above. This is accomplished by sizing the weights 22 and 26 relative to the intermediate weight such that the sum of the force generated by the weights 22 and 26 is unequal to the force generated by the intermediate weight 24. Therefore, as can be sen in FIGS. 15a-15h and as will become evident from the following discussion of these figures, as the weights 22, 24, 26 rotate the phase angle, or angle of attack, of the resultant force vector "R" changes as the resultant force vector "R" varies in magnitute. Therefore, the resultant force vector "R" provides an orbital or elliptical vibrating force generation, or drive force, to the conveyor apparatus 10.

Figure 15G:
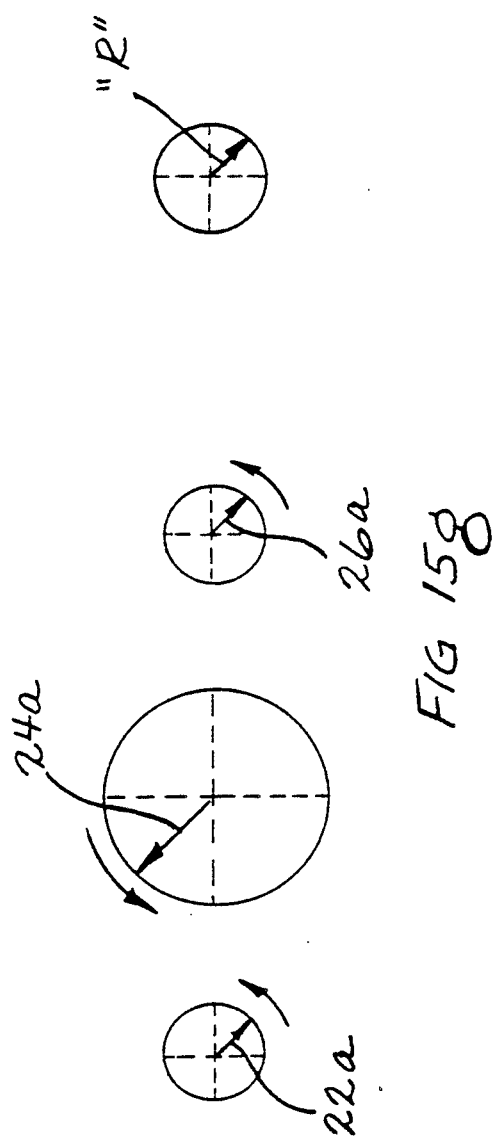
Figure 15H:
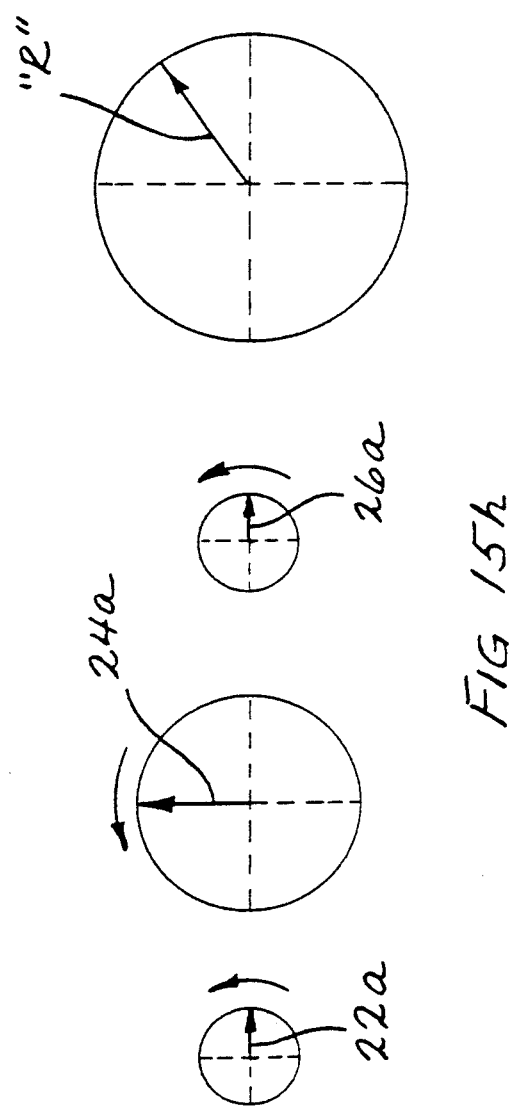

With continued reference to FIGS. 15a-15h, in the following discussion, let us assume that the outermost weights 22 and 26 each generate a force of 30 pounds and the intermediate weight 24 generates a force of 40 pounds. The circles circumscribing each of the weights 22, 24, 26 in FIGS. 15a-15h do not indicate rotation of the weights 22, 24, 26 but are only imaginary circles depicting the unit circles mentioned in the following discussion to aid in identifying the quadrant positions of the force vectors 22a, 24a, 26a generated by the weights 22, continuously rotate. As can be seen in FIG. 15a, at a time equal to zero, the vectors 22a 24a, 26a are each at an angle of 45° in the first quadrant, and the resultant force vector "R" generated thereby is at a maximum of 100 pounds, at an angle of attack, or phase angle of 45° in the first quadrant. As can be seen in 15b, as the weights 22, 24, 26 continue to rotate, at a time equal to $\pi$/4, or 45° of rotation from the time equal to zero, the vectors 22a and 26a are each at a quadrantal angle of 90°, the vector 24a is at a quadrantal angle of 0°, and the resultant force vector "R" generated thereby is at an angle of attack, or phase angle, of 56.3° in the first quadrant at a force of about 72 pounds. As can be seen in FIG. 15c, as the weights 22, 24, 26 continue to rotate, and at a time equal to $\pi$/2 or 90° of rotation from time equal to zero, the vectors 22a and 26a are each at an angle of 135° in the second quadrant, the vector 24a is at an angle of 315° in the fourth quadrant, and the resultant force vector "R" is, therefore, at an angle of attack, or phase angle, of 135° in the second quadrant at a force of 20 pounds. As can be seen in FIG. 15d, as the weights 22, 24, 26 continue to rotate, and at a time equal to 3/4$\pi$, or 135° of rotation from the time equal to zero, the vectors 22a and 26a are each at a quadrantal angle of 180°, the vector 24a is at a quadrantal angle of 270, and the resultant force vector "R" is, therefore, at an angle of attack of 213.7° in the third quadrant at a force of about 72 pounds. As can be seen in FIG. 15e, as the weights 22, 24, 26 continue to rotate, and at a time equal to $\pi$, or 180° of rotation from the time equal to zero, the vectors 22, 24, 26 are each at an angle of 225° in the third quadrant and the resultant force vector "R" is, therefore, at a maximum of 100 pounds at an angle of attack, or phase angle, of 225° in the third quadrant. As can be seen in FIG. 15f, as the weights 22, 24, 26 continue to rotate, and at a time equal to 5/4$\pi$, or 225° of rotation from time equal to zero, the vectors 22a and 24a are each at a quadrantal angle of 180, and the resultant force vector "R" is, therefore, at an angle of attack, or phase angle, of 236.3° in the third quadrant at a force of about 72 pounds. As can be seen in FIG. 15g, as the weights 22, 24, 26 continue to rotate, and at a time equal to 3/2$\pi$, or 270° of rotation from time equal to zero, the vectors 22a and 26a are each at an angle of 315° in the fourth quadrant, the vector 24a is at an angle of 135° in the second quadrant, and the resultant force vector "R" is, therefore, at an angle of attack of 315° in the foourth quadrant at a force of 20 pounds. As can be seen in FIG. 15h, as the weights 22, 24, 26 continue to rotate, and at a time equal to 7/4$\pi$, or 315° of rotation from the time equal to zero, the vectors 22a and 26a are each at a quadrantal angle of 0°, the vector 24a is at a quadrantal angle of 90°, and the resultant force vector "R" is, therefore, at a 33.7° angle of attack in the first quadrant at a force of about 72 pounds. In sequentially reviewing FIGS. 15a through 15h, it can be seen that as the weights 22, 24, 26 rotate, they generate a resultant force vector "R" which both varies in magnitute and continuously varies in direction.

The difference between the drive system 20 which generates an elliptical or orbital driving force to the conveyor apparatus, and the drive system 20 which generates a linear driving force to the conveyor apparatus can clearly be seen by comparing FIGS. 15a–15h to FIGS. 10a–10h, respectively.

Now with reference to FIG. 16, there is depicted an alternative embodiment of a phase angle adjustment means, generally denoted as the numeral 152, which replaces the phase angle adjustment means 52 of FIGS. 1 and 2, for selectively changing or varying the phase angle relationship between the outermost weights 22 and 26 and the intermediate weight 24. All features of the drive system 20 remain as discussed above. The phase angle adjustment means 152 is shown as a multiple epicyclic gear train. The multiple epicyclic gear train includes a first epicyclic gear train 180 in coaxiual alignment with a second epicyclic gear train 182. The first epicyclic gear train 180 comprises a first sun gear 184, a first ring 186 and a first planet gear 188 in meshing engagement with the first sun gear 184 and first ring gear 186. The first ring gear 186 is fixed against rotation. The second epicyclic gear train 182 comprises a second sun gear 190, a second ring gear 192, and a second planet gear 194 in meshing engagement with the second sun gear 190 and second ring gear 192. The second ring gear 192 is mounted for selective movement about the second sun gear 190 by moving means, generally denoted as the numneral 196, so that the second ring gear 192 can be selectively rotated or indexed about the second sun gear 190, and selectively held fixed against rotation. The first and second epicyclic gear trains 180 and 182 are disposed in spaced-apart relationship with the first sun gear 184 of the first gear train 180 in coaxial alignment with the second sun gear 190 of the second gear train 182. The second epicyclic gear train 182 also includes a hollow driven shaft 198 concentrically affixed to the second sun gear 192 for rotation therewith. The intermediate axle 30 extends coaxially through the hollow driven shaft 198 of the second gear train 182 such that the intermediate axle 30 can rotate relative to the hollow driven shaft 198, and is concentrically attached to the first sun gear 184 of the first gear train 180 such that the intermediate axle 30 and first sun gear 184 rotate together. The driven pulley 44 is attached to the extending end of the intermediate axle 30 so that the intermediate axle 30 rotates with the driven pulley 44. The drive sheave 40 is attached to the extending end of the hollow driven shaft 198 so that hollow driven shaft 198 rotates with the drive sheave 40. The first planet gear 188 of the first epicyclic gear train 180 and second planet gear 194 of the second epicyclic gear train 182 are coaxial and interconnected by a shaft 200 so that the first planet gear 186 and second planet gear 194 sychronously orbit about their respective sun gears 184 and 192. The intermediate eccentric weight 24 is affixed to the intermediate axle 30 in the space between the first epicyclic gear train 180 and second epicyclic gear train 182 for rotation with the intermediate axle 30. The first ring gear 186 can be mounted to a mounting block (not shown) which is attached to the mounting plate 34, and the second ring 192 can be mounted in a bearing block (not shown) for rotation therein, and the bearing block is attached to the mounting plate 34. The second ring gear moving means 196 is shown as including a pinion gear 202 circumscribing the second ring gear 192 and a worm gear 204 mounted in the bearing block for rotation about its longitudinal axis and in meshing engagement with the pinion gear 202, so that as the worm gear 204 is rotated, it causes the second ring gear 192 to rotate about the coaxis with the second sun gear 190, and when the worm gear 204 is stationary, it holds the second sun gear 190 against rotation.

In operation, with the second ring gear 196 of the second epicyclic gear train 182 locked against rotation, the motor 46 directly drives the intermediate or second axle 30 through the drive belt 50 and sheave 44 on the axle 30, for example in a counter-clockwise direction as seen in FIG. 16. The intermediate weight 24 being attached to the intermediate axle 30 is, therefore, rotated in a counter-clockwise direction. The axle 30 causes the first sun gear 184 to also rotate counter-clockwise which in turn causes the first planet gear 188 to rotate in a clockwise direction and, therefore, to orbit in a counter-clockwise direction about the first sun gear 184. Because the first planet gear 188 is connected to the second planet gear 194 by the interconnecting shaft 200, the counter-clockwise orbiting first planet gear 188 causes the second planet gear 194 to also orbit in a counter-clockwise direction about the second sun gear 190 and in so doing, the second planet gear 194 rotates in a clockwise direction. The orbiting second planet gear 194 in turn causes the second sun gear 190 to rotate in a counter-clockwise direction, and the rotating second sun gear 190 causes the hollow driven shaft 198 and second sheave 40 to rotate counter-clockwise. The second sheave 40 then drives the first axle 28 and third axle 32, through the first sheave 38, third sheave 42 and drive belt 60, to rotate in a clockwise direction which, thereby, causes the outermost weights 22 and 26 to also rotate in a clockwise direction, or in an opposite direction to the rotation of the intermediate weight 24.

In order to change the phase angle "a" of the intermediate weight 24 relative to the phase angle "a" of the outermost weights 22 and 26, even as the drive system 20 is operating, the second ring gear 192 of the second epicyclic gear train 182 is rotated a selected amount by turning the worm gear 204 of the ring gear moving means 196 to, for example, rotate the second ring gear 192 clockwise through a given angle of say 20°. As the second ring gear 192 is rotated clockwise, it causes the second planet gear 194 to rotate clockwise and, therefore, orbit in a clockwise direction around the second sun gear 190. The clockwise orbital motion of the second planet gear 194 causes the first planet gear 188 to also orbit in a clockwise direction about the second sun gear 184 because of the interconnecting shaft 200 interconnecting the first and second planet gears. As the second planet gear orbits clockwise, it rotates in a clockwise direction and, therefore, causes the first sun gear 184 to rotate in a counter-clockwise direction. The counter-clockwise rotating first sun gear 184 causes the intermediate axle 30 to also rotate counter-clockwise and, therefore, causes the intermediate weight 30 to rotate counter-clockwise so that the intermediate weight 24 is indexed changing the phase angle of the intermediate weight 24 relative to the outermost weights 22 and 26.

The foregoing detailed description is given primarily for clearness of understanding and changes may become obvious to those skilled in the art upon reading this disclosure and may be made without departing from the spirit of the inventnion and scope of the appended claims.

I claim:

1. A vibratory drive system for a vibratory conveyor apparatus for selectively adjusting the conveying speed from zero to a maximum, and for selectively changing the conveying direction of the vibratory conveyor apparatus between forward and reverse while the vibrating drive system is operating comprising:

three eccentric weights disposed in side-by-side relationship at relative phase angles to each other;

means for mounting the eccentric weights for rotation about parallel axes;

means for attaching the rotatable weights to the conveyor apparatus to impart a resulting vibratory force thereto as the weights are rotated, drive means for rotating the outermost weights about their respective axis of rotation in a first direction and rotating the intermediate weight about its axis of rotation in a second direction opposite to the first direction of the outermost weights;

phase angle adjustment means for selectively changing the relative phase angle between the outermost eccentric weights and intermediate eccentric weight thereby selectively changing the magnitude and direction of the resulting vibratory force generated by the rotating eccentric weights to the conveyor apparatus.

2. The vibratory drive system of claim 1, wherein the phase angle adjustment means comprises means for selectively changing the phase angle of the intermediate eccentric weight relative to the phase angles of the outermost weights, while maintaining the phase angle of each of the outermost weights at the initial phase angle.

3. The vibratory drive system of claim 2, wherein:
(a) the means for mounting the three eccentric weights for rotation about parallel axes comprises:
a first axle to which the first one of the three eccentric weights is attached for rotation therewith;
a second axle to which the second one of the three eccentric weights is attached for rotation therewith, the second axle being parallel to the first axle; and,
a third axle to which the third one of the three eccentric weights is attached for rotation therewith, the third axle being parallel to the second axle and located to the opposite side of the second axle from the first axle;
(b) the drive means comprises:
a first sheave attached to the first axle;
a second sheave attached to the second axle;
a third sheave attached to the third axle; and,
a driven belt interconnecting the first, second, and third sheaves with the inside surface of the belt in contact with the first and third sheaves, and with the outside surface of the belt in contact with the second sheave such that the driven belt follows a serpentine path as it encompasses the first, second, and third sheaves;
(c) the phase angle adjustment means comprises:
a first idler sheave located between the first sheave and the second sheave;
a second idler sheave located between the second sheave and the third sheave;
the driven belt encompassing the first idler sheave and the second idler sheave with the inside surface of the driven belt in contact with the first and second idler sheaves; and
means for selectively either increasing the length of the portion of the driven belt between the first idler sheave and the first sheave and concurrently shortening the length of the portion of the driven belt between the second idler sheave and the third sheave, and shortening the length of the portion of the driven belt between the first idler sheave and first sheave and concurrently increasing the length of the portion of the driven belt between the second idler sheave and the third sheave.

4. The vibratory drive system of claim 3, wherein the means for changing the length of the driven belt comprises:
a phase angle adjustment plate mounted to the second axle for selective movement through an arc centered on the second axle;
the first idler sheave mounted to the phase angle adjustment plate for rotation; and
the second idler sheave mounted to the phase angle adjustment plate for rotation.

5. The vibratory drive system of claim 4, further comprising phase angle adjustment plate moving means for selectively moving the phase angle adjustment plate in a clockwise arcuate direction and in a counter-clockwise arcuate direction.

6. The vibratory drive system of claim 3, wherein the drive means comprises:
a drive motor;
a driven pulley attached to the second one of the axles; and,
drive belt interconnecting the drive motor and the driven pulley.

7. The vibratory drive system of claim 2, wherein the phase angle adjustment means comprises epicyclic gear train means operatively associated with the second axle.

8. The vibratory drive system of claim 7, wherein:
(a) the means for mounting the three eccentric weights for rotation about parallel axes comprises:
a first axle to which the first one of the three eccentric weights is attached for rotation therewith;
a second axle to which the second one of the three eccentric weights is attached for rotation therewith, the second axle being parallel to the first axle; and
a third axle to which the third one of the three eccentric weights is attached for rotation and located to the opposite side of the second axle from the first axle; and
(b) the epicyclic gear train means comprises:
a first epicyclic gear train having a first sun gear, a first planet gear, and a first ring gear; the first sun gear being concentrically mounted to the second axle for rotation therewith;
a second epicyclic gear train having a second sun gear, a second planet gear, and a second ring gear, the second sun gear being concentrically mounted on the second axle for rotation thereon, and,
means for interconnecting the first planet gear of the first epicyclic gear train to the second planet gear of the second epicyclic gear train so that the first planet gear and second planet gear synchronously orbit about the first sun gear and second sun gear, respectively.

9. The vibratory drive system of claim 8, wherein:
the first ring gear of the first epicyclic gear train is fixed against rotation; and
the second ring gear of the second epicyclic gear train is mounted for selective rotational movement about the second sun gear.

* * * * *